US012189205B2

(12) United States Patent
Lin et al.

(10) Patent No.: US 12,189,205 B2
(45) Date of Patent: Jan. 7, 2025

(54) OPTICAL ELEMENT DRIVE MECHANISM

(71) Applicant: TDK TAIWAN CORP., Taoyuan (TW)

(72) Inventors: Yi-Chieh Lin, Taoyuan (TW);
Shou-Jen Liu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 594 days.

(21) Appl. No.: 17/514,455

(22) Filed: Oct. 29, 2021

(65) Prior Publication Data

US 2022/0137320 A1 May 5, 2022

Related U.S. Application Data

(60) Provisional application No. 63/108,051, filed on Oct. 30, 2020.

(51) Int. Cl.
*G02B 27/64* (2006.01)
*G02B 7/08* (2021.01)

(52) U.S. Cl.
CPC .............. *G02B 7/08* (2013.01); *G02B 27/646* (2013.01)

(58) Field of Classification Search
CPC ........ G02B 7/08; G02B 27/646; G02B 7/025; G02B 7/09; G03B 5/00; G03B 13/36
See application file for complete search history.

(56) References Cited

U.S. PATENT DOCUMENTS

| 8,660,416 | B2* | 2/2014 | Asakawa | G02B 27/64 |
| | | | | 359/554 |
| 8,982,256 | B2* | 3/2015 | Tobinaga | H04N 23/54 |
| | | | | 348/308 |
| 2011/0103782 | A1* | 5/2011 | Tsuruta | H04N 23/55 |
| | | | | 359/557 |
| 2019/0346654 | A1* | 11/2019 | Hu | G03B 13/36 |

FOREIGN PATENT DOCUMENTS

CN 113985565 A 1/2022

OTHER PUBLICATIONS

Office Action issued on Apr. 7, 2022 for the corresponding Application No. 202122635946.3 in China.

* cited by examiner

*Primary Examiner* — Mustak Choudhury
(74) *Attorney, Agent, or Firm* — MUNCY, GEISSLER, OLDS & LOWE, P.C.

(57) ABSTRACT

An optical element drive mechanism is provided. The optical element drive mechanism includes an immovable part, a movable part, a drive assembly, and a circuit assembly. The immovable part includes a receiving space. The movable part is connected to an optical element that includes an optical axis. The movable part is movable relative to the immovable part. The movable part is located in the receiving space of the immovable part. The drive assembly drives the movable part to move relative to the immovable part. The circuit assembly is electrically connected to the drive assembly.

19 Claims, 22 Drawing Sheets

OPTICAL ELEMENT DRIVE MECHANISM

CROSS REFERENCE TO RELATED APPLICATIONS

This application claims the benefit of U.S. Provisional Application No. 63/108,051, filed on Oct. 30, 2020, the entirety of which is incorporated by reference herein.

BACKGROUND OF THE INVENTION

Field of the Invention

The present invention relates to a drive mechanism, and in particular, to an optical element drive mechanism.

Description of the Related Art

As technology has developed, many electronic devices (such as tablet computers and smartphones) may be used for capturing images and recording video. The optical element and the optical element drive mechanism in the electronic device allow the user to use the electronic device to capture images and record video. When the electronic device is being used, shock or vibration may occur, and this may cause the images or video to come out blurry. Therefore, the demand for higher quality images and video is increasing.

BRIEF SUMMARY OF THE INVENTION

An optical element drive mechanism is provided. The optical element drive mechanism includes an immovable part, a movable part, a drive assembly, and a circuit assembly. The immovable part includes a receiving space. The movable part is connected to an optical element that includes an optical axis. The movable part is movable relative to the immovable part. The movable part is located in the receiving space of the immovable part. The drive assembly drives the movable part to move relative to the immovable part. The circuit assembly is electrically connected to the drive assembly.

In some embodiments, the circuit assembly includes a first circuit element, a second circuit element, and a first connection portion. The first circuit element has a plate-like structure and perpendicular to a main axis. The second circuit element has a plate-like structure and perpendicular to the main axis. The first connection portion is connected to the first circuit element and the second circuit element. The first circuit element is electrically connected to the second circuit element via the first connection portion. When viewed from the main axis, the first circuit element and the second circuit element at least partially overlap.

In some embodiments, the optical element drive mechanism further includes an adhesive element. The first circuit element is fixedly connected to the second circuit element via the adhesive element, and the adhesive element is in direct contact with the first circuit element, the second circuit element, and the first connection portion. The first circuit element, the second circuit element, and the first connection portion are formed integrally as one piece. The first circuit element is connected to the first connection portion without any connective techniques. The second circuit element is connected to the first connection portion without any connective techniques. In some embodiments, the circuit assembly further includes a base having a plate-like structure, the base extends continuously in the first circuit element, the second circuit element, and the first connection portion.

In some embodiments, the optical element drive mechanism is polygonal, the optical element drive mechanism includes a mechanism first side, a mechanism second side, a mechanism third side, and a mechanism fourth side, the mechanism first side is opposite the mechanism third side, and the mechanism second side is opposite the mechanism fourth side. The first circuit element includes a first side, the second circuit element includes a second side, and when viewed from the main axis, the first side of the first circuit element and the second side of the second circuit element are located on the mechanism first side. The first connection portion protrudes from the first side of the first circuit element and the second side of the second circuit element. The first circuit element further includes a first protrusion, the first protrusion protrudes from the first side of the first circuit element, and a first gap is between the first protrusion and the first connection portion. The second circuit element includes a second protrusion, the second protrusion protrudes from the second side of the second circuit element, and a second gap is between the second protrusion and the first connection portion. When viewed from the main axis, the first protrusion and the second protrusion at least partially overlap. When viewed from the main axis, the first gap and the second gap at least partially overlap. In some embodiments, the thickness of the first circuit element and the thickness of the second circuit element are both greater than the thickness of the first connection portion.

In some embodiments, the optical element drive mechanism further includes a sensing assembly sensing movement of the movable part relative to the immovable part. The sensing assembly includes a reference element and a sensing element. The sensing element corresponds to the reference element. The first circuit element includes a first surface, a second surface, a first circuit, and a substrate, the first surface is opposite the second surface, the second surface faces the second circuit element, and at least part of the first circuit is embedded in the substrate and not revealed from the substrate. The sensing element is disposed on the first surface of the first circuit element, and the sensing element is electrically connected to the first circuit of the first circuit element.

In some embodiments, the circuit assembly further includes an external connection circuit, the external connection circuit is electrically connected to the first circuit element, the external connection circuit has a plate-like structure that is not parallel with the first circuit element, and the circuit assembly is electrically connected to an external circuit via the external connection circuit. The thickness of the external connection circuit is less than the thickness of the second circuit element, the thickness of the external connection circuit is identical to the thickness of the first circuit element, and the thickness of the second circuit element is different from the thickness of the first circuit element. The circuit assembly further includes a base having a plate-like structure. The base extends continuously in the first circuit element, the second circuit element, and the first connection portion and to the external connection circuit. The immovable part includes a bottom, the bottom includes a bottom opening and a bottom recess, a light passes through the bottom opening, the bottom recess is formed on a surface of the bottom, the bottom recess has a concave structure and corresponds to the sensing element, and the bottom recess communicates with the bottom opening. In some embodiments, the thickness of the first circuit element is less than the thickness of the second circuit element.

In some embodiments, the first circuit element further includes a second circuit, the drive assembly includes a first coil and a second coil, the first coil is disposed in the second circuit element, the second coil is disposed in the first circuit element, and the first coil is electrically connected to the second coil and the second circuit. When viewed from the main axis, the first coil and the second circuit do not overlap. When viewed from the main axis, the first coil and the second coil at least partially overlap.

In some embodiments, the mechanism first side extends along a first axis that is perpendicular to the main axis, the mechanism second side extends along a second axis that is perpendicular to the main axis. The optical element drive mechanism includes a first corner, a second corner, a third corner, and a fourth corner, a connecting line between the first corner and the second corner is parallel with the first axis, and a connecting line between the first corner and the third corner is parallel with the second axis. When viewed from the main axis, the mechanism first side and the mechanism third side are located on opposite sides of the movable part. The circuit assembly further includes a third circuit element and a second connection portion. The third circuit element has a plate-like structure and perpendicular to the main axis. The second connection portion connected to the first circuit element and the third circuit element. The first circuit element is electrically connected to the third circuit element via the second connection portion. When viewed from the main axis, the first circuit element and the third circuit element at least partially overlap. The first circuit element further includes a third side, the third circuit element includes a fourth side, and when viewed from the main axis, the third side of the first circuit element and the fourth side of the third circuit element are located on the mechanism third side. The second connection portion protrudes from the third side of the first circuit element and the fourth side of the third circuit element. In some embodiments, the thickness of the third circuit element is identical to the thickness of the second circuit element, and the thickness of the first circuit element is identical to the thickness of the second circuit element. In some embodiments, when viewed from the main axis, the second circuit element and the third circuit element do not overlap. When viewed from the second axis, the second circuit element and the third circuit element at least partially overlap.

In some embodiments, the first circuit element further includes a third circuit, the drive assembly further includes a third coil and a fourth coil, the third coil is disposed in the third circuit element, the fourth coil is disposed in the first circuit element, and the third coil is electrically connected to the fourth coil and the second circuit. When viewed from the main axis, the third coil and the third circuit do not overlap. When viewed from the main axis, the third coil and the fourth coil at least partially overlap.

In some embodiments, the first coil and the third coil are electrically independent. When viewed from the main axis, the first coil and the third coil do not overlap. When viewed from the main axis, the first coil is located on the first corner and the second corner, and the third coil is located on the third corner and the fourth corner.

In some embodiments, when viewed from the main axis, a first space is formed between the second circuit element and the third circuit element, and the first space is located on the mechanism second side. When viewed from the main axis, a second space is formed between the second circuit element and the third circuit element, and the second space is located on the mechanism fourth side. When viewed from the main axis, a connecting line between a center of the first space and a center of the second space is neither parallel with nor perpendicular to the first axis. When viewed from the first axis, the first space and the second space do not overlap. When viewed from the second axis, the first space and the second space do not overlap.

In some embodiments, the bottom includes a first positioning element and a second positioning element, and the first positioning element and the second positioning element correspond to the circuit assembly. When viewed from the main axis, the first positioning element is located on the mechanism second side, and the second positioning element is located on the mechanism fourth side. When viewed from the main axis, the first positioning element and the second positioning element are arranged along the first axis.

In some embodiments, the circuit assembly further includes an external connection circuit, the external connection circuit and the bottom are formed integrally as one piece, at least part of the external connection circuit is embedded in the bottom and not revealed from the bottom, and the circuit assembly is electrically connected to an external circuit via the external connection circuit. The first surface of the first circuit element faces the external connection circuit.

In some embodiments, the circuit assembly further includes an electrical contact between the first surface and the external connection circuit. The bottom further includes a a bottom notch, the bottom notch is formed on the surface of the bottom, and the bottom notch has a concave structure and corresponds to the electrical contact. The external connection circuit includes an external connection circuit opening, a light passes through the external connection circuit opening, the external connection circuit opening communicates with the bottom recess, and the external connection circuit opening and the bottom notch are separate. In some embodiments, the external connection circuit further includes a projecting portion protruding from the bottom notch

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following disclosure provides many different embodiments, or examples, for implementing different features of the subject matter provided. Specific examples of components and arrangements are described below to simplify this disclosure. These are, of course, merely examples and are not intended to be limiting. For example, the formation of a first feature "on" and/or "above" a second feature in the description that follows may include embodiments in which the first and second features are formed in direct contact, and may also include embodiments in which additional features may be formed between the first and second features, so that the first and second features may not be in direct contact. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly. In addition, in different examples of this disclosure, symbols or alphabets may be used repeatedly.

Ordinal terms such as "first", "second", etc., used in the description and in claims do not by themselves connote any priority, precedence, or order of one element over another, but are used merely as labels to distinguish one element from another element having the same name. Unless the context requires otherwise, throughout the specification and claims that follow, the word "include", "have" and variations thereof, such as "includes", "including", "having" are to be construed in an open, inclusive sense, that is, as "including, but not limited to."

Figure 1:
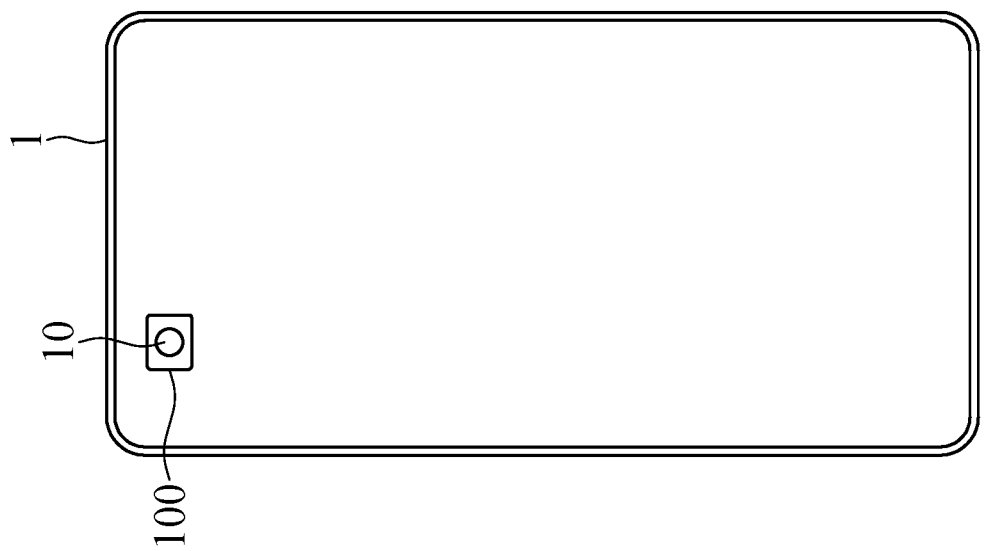
FIG. 1 is a schematic view of the electronic device, the optical element, and the optical element drive mechanism.
Figure 2:
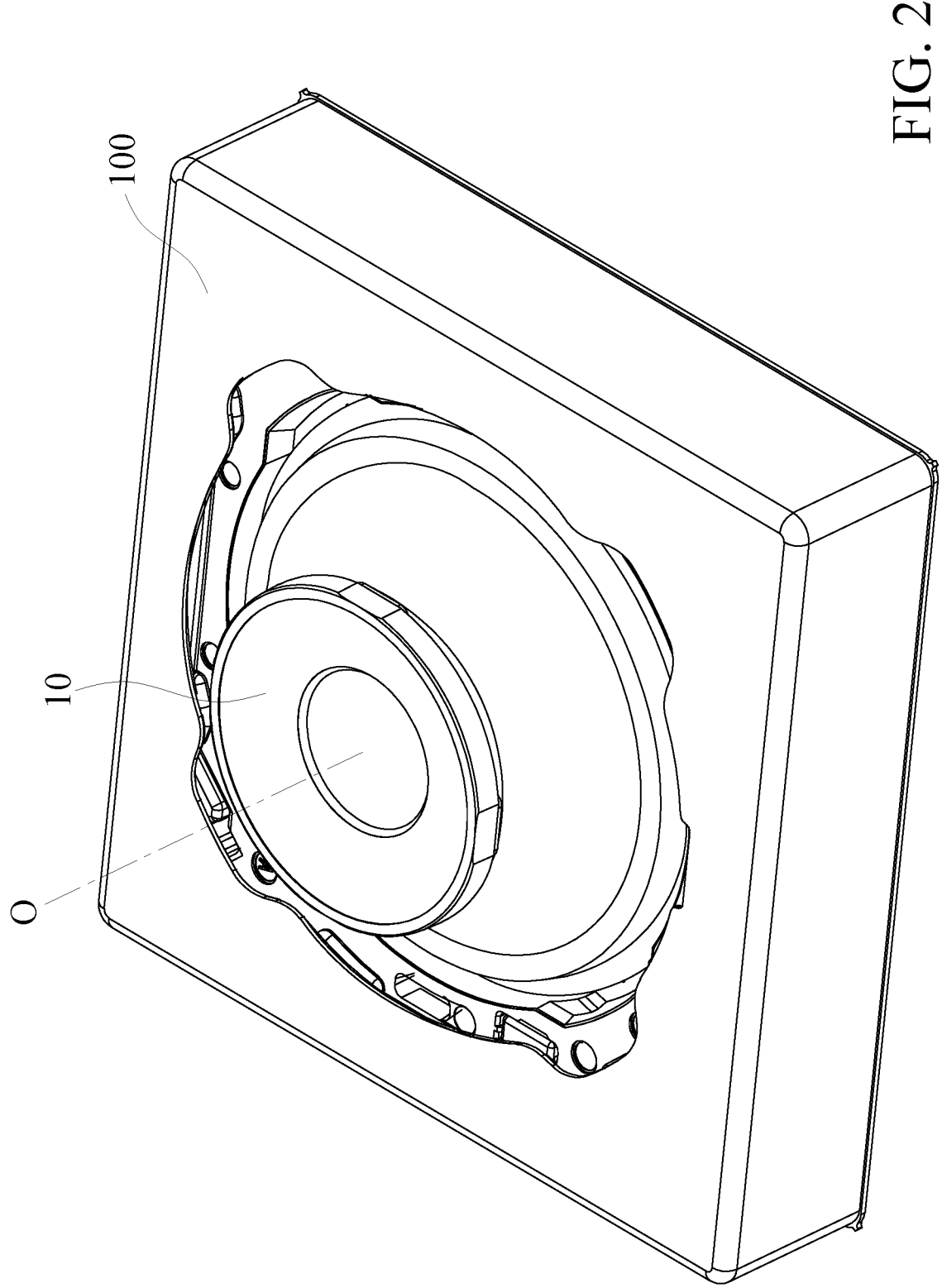
FIG. 2 is a schematic view of the optical element and the optical element drive mechanism.

Please refer to FIG. 1 and FIG. 2. FIG. 1 is a schematic view of an electronic device 1, an optical element 10, and an optical element drive mechanism 100. FIG. 2 is a schematic view of the optical element 10 and the optical element drive mechanism 100. The electronic device 1 may be a tablet computer, a smart phone, etc. The optical element 10 may be a lens. The optical element 10 may be made of plastic or glass. The optical element 10 may be circular or it may have another shape. The optical element 10 and the optical element drive mechanism 100 may be disposed in the electronic device 1, so that a user may capture images and record video. The optical element drive mechanism 100 may hold the optical element 10 and drive the optical element 10 to move, so as to adjust the position of the optical element 10 to capture clear images. The optical element 10 and the optical element drive mechanism 100 are typically placed in the top region of the electronic device 1 to increase the display area of the electronic device 1.

Figure 3:
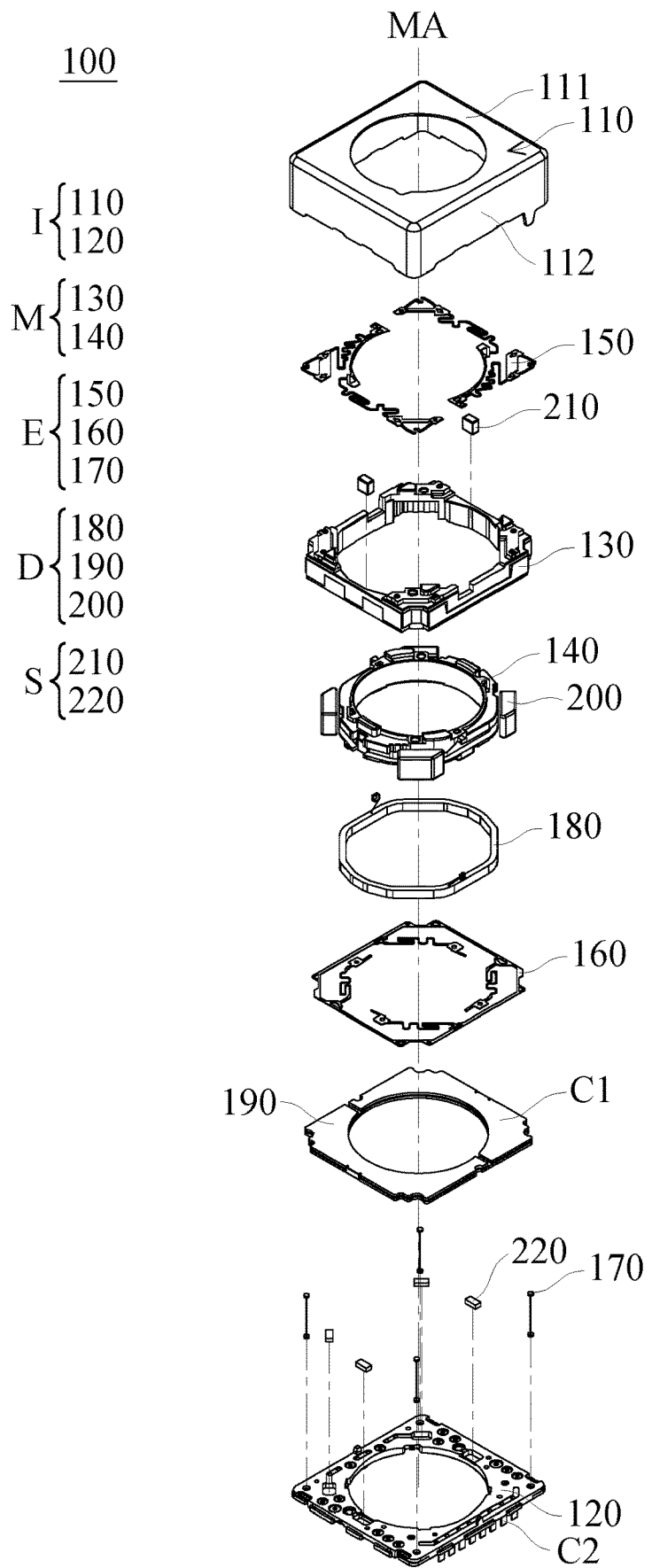
FIG. 3 is an exploded view of the optical element drive mechanism.

The optical element 10 has an optical axis O. The optical axis O is an imaginary axis passing through the center of the optical element 10. The optical element drive mechanism 100 includes a main axis MA (as shown in FIG. 3). The main axis MA is an imaginary axis passing through the center of the optical element drive mechanism 100. When the optical element 10 and the optical element drive mechanism 100 are aligned, the optical axis O substantially overlaps the main axis MA of the optical element drive mechanism 100. Therefore, in the followings and in the drawings, the optical axis O of the optical element 10 or the main axis MA of the optical element drive mechanism 100 may be used to illustrate or describe the related features of the optical element drive mechanism 100. It should be noted that, since the optical element 10 is movably placed in the optical element drive mechanism 100, the optical axis O may be not exactly overlap the main axis MA of the optical element drive mechanism 100 because of the movement, shake, rotation, tilt, and the like, of the optical element drive mechanism 100. The optical element drive mechanism may be further connected to an external module, such as an image sensor module (e.g. a module that includes a charge-coupled detector (CCD)), so that the light entering the optical element drive mechanism 100 may be converted into an image on the external module.

Figure 4:
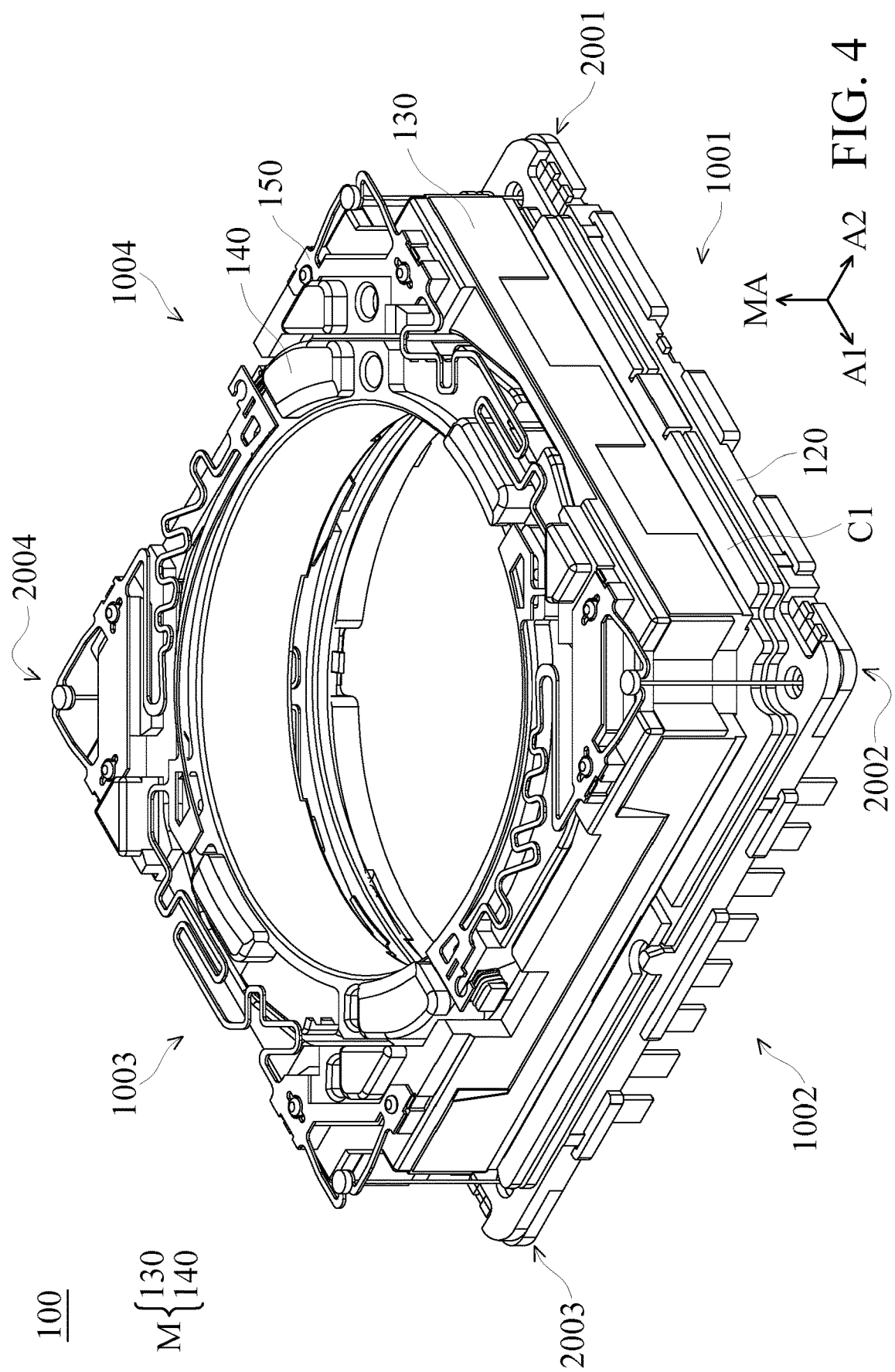
FIG. 4 and FIG. 5 are perspective views of the optical element drive mechanism, in which the omitted elements are not exactly the same.
Figure 5:
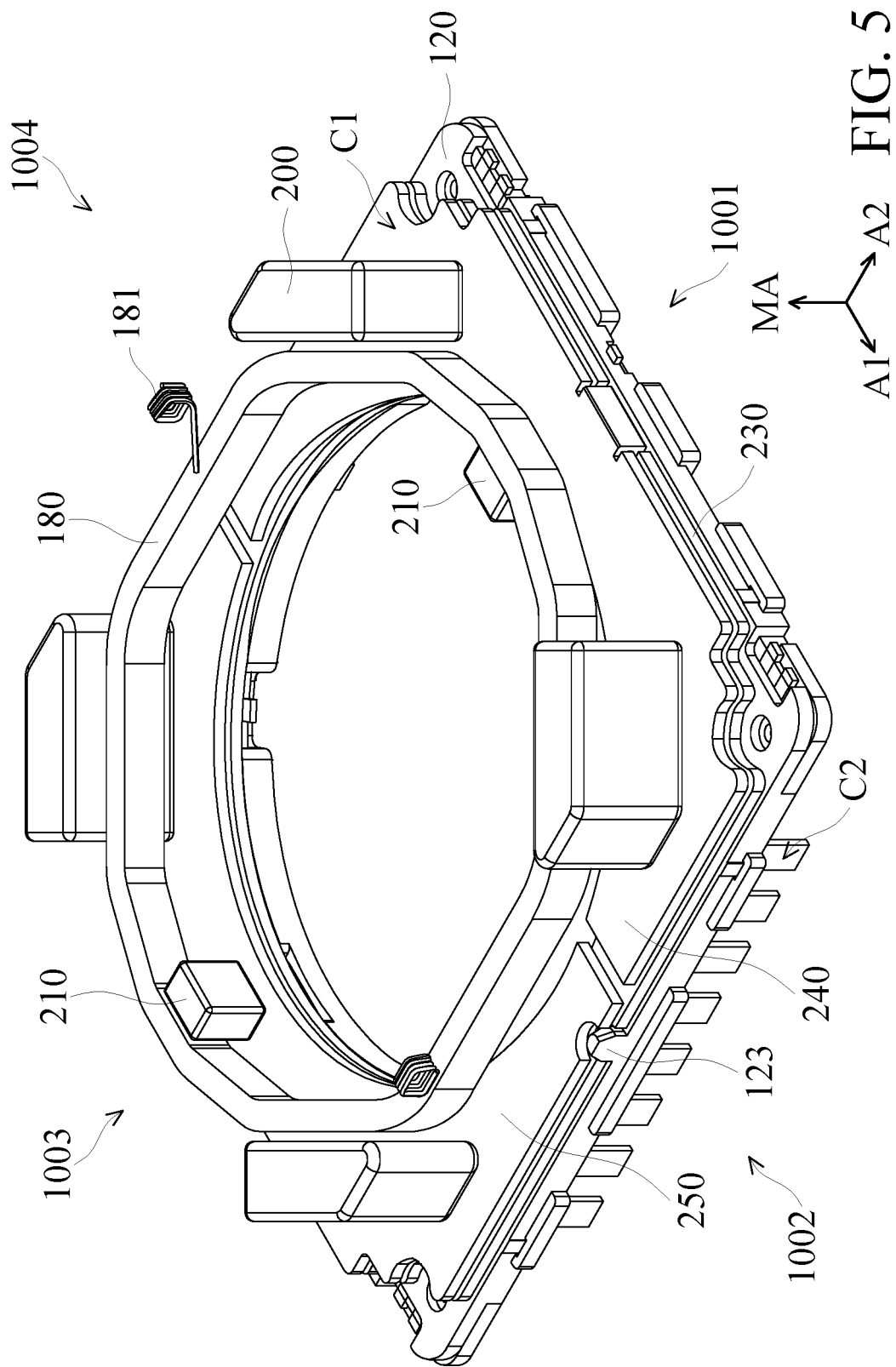
Figure 6:
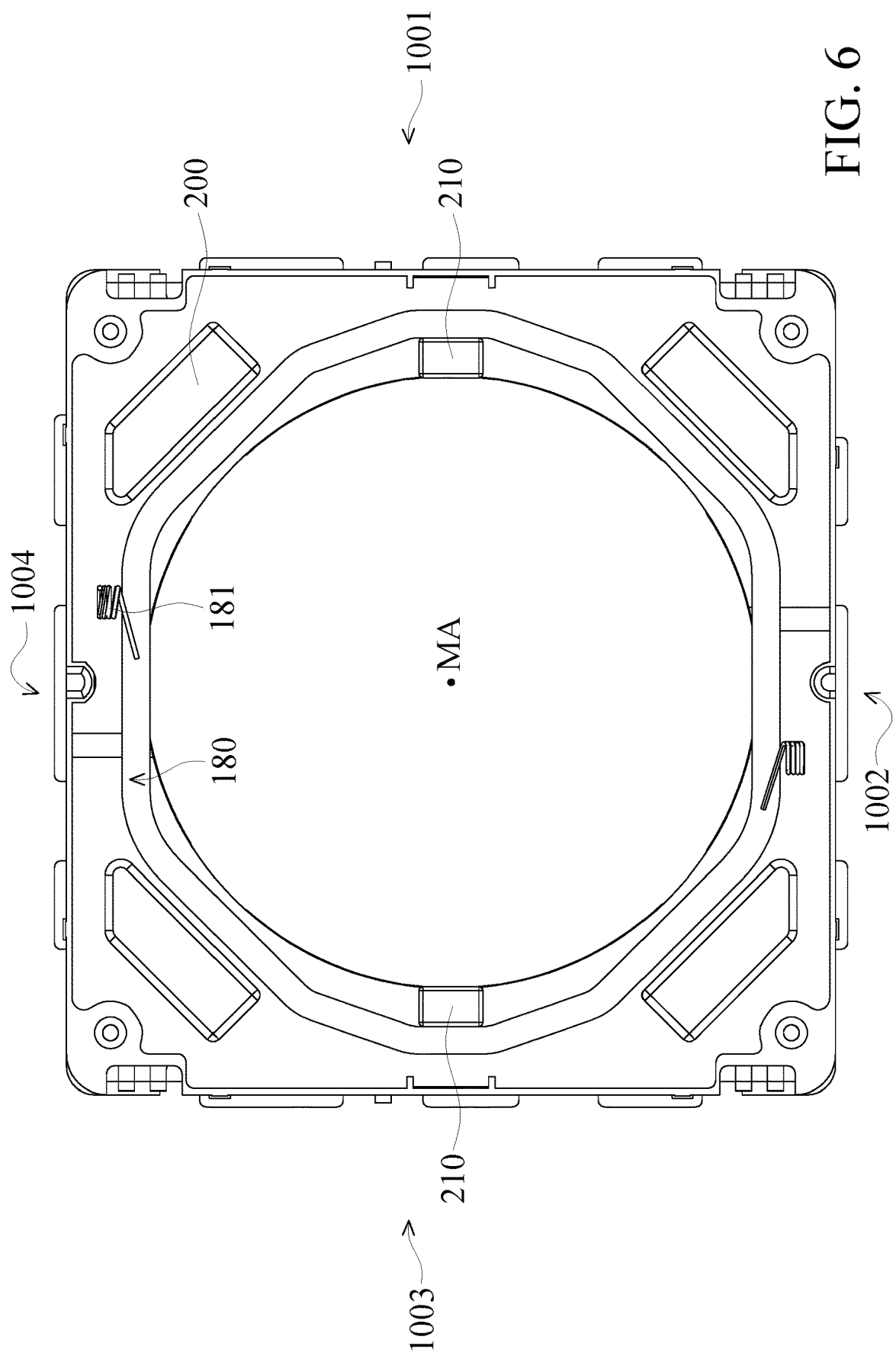
FIG. 6 is a top view of the optical element drive mechanism of FIG. 5.

Next, please refer to FIG. 3 to FIG. 6. FIG. 3 is an exploded view of the optical element drive mechanism 100. FIG. 4 and FIG. 5 are perspective views of the optical element drive mechanism 100, in which the omitted elements are not exactly the same. FIG. 6 is a top view of the optical element drive mechanism 100 of FIG. 5. When viewed from the main axis MA, the optical element drive mechanism 100 is polygonal, such as quadrilateral. For ease of illustration, the four sides of the optical element drive mechanism 100 are a mechanism first side 1001, a mechanism second side 1002, a mechanism third side 1003, and a mechanism fourth side 1004. The mechanism first side 1001, the mechanism second side 1002, the mechanism third side 1003, and the mechanism fourth side 1004 are substantially perpendicular to the main axis MA. The mechanism first side 1001 is opposite the mechanism third side 1003, and the mechanism second side 1002 is opposite the mechanism fourth side 1004.

The mechanism first side 1001 is substantially parallel with the mechanism third side 1003, and the mechanism second side 1002 is substantially parallel with the mechanism fourth side 1004. When viewed form the main axis MA, the mechanism first side 1001 and the mechanism third side 1003 are parallel with a first axis A1, and the mechanism first side 1001 and the mechanism third side 1003 extend along the first axis A1. The first axis A1 is substantially perpendicular to the main axis MA. When viewed from the main axis MA, the mechanism second side 1002 and the mechanism fourth side 1004 are parallel with a second axis A2, and the mechanism second side 1002 and the mechanism fourth side 1004 extend along the second axis A2. Furthermore, the four corners of the optical element drive mechanism 100 are a first corner 2001, a second corner 2002, a third corner 2003, and a fourth corner 2004. The connecting line between the first corner 2001 and the second corner 2002 is substantially parallel with the first axis A1. The connecting line between the first corner 2001 and the third corner 2003 is substantially parallel with the second axis A2.

The optical element drive mechanism 100 includes an immovable part I, a movable part M, an elastic assembly E, a drive assembly D, a sensing assembly S, a first circuit assembly C1, and a second circuit assembly C2. The movable part M is connected to the optical element 10. The movable part M is movable relative to the immovable part I. The elastic assembly E is connected to the movable part M. The drive assembly D drives the movable part M to move relative to the immovable part I. The first circuit assembly C1 and the second circuit assembly C2 constitute a circuit assembly. The first circuit assembly C1 and the second circuit assembly C2 are electrically connected to the drive assembly D, and the current may be supplied to the optical element drive mechanism 100 and transmitted in the optical element drive mechanism 100 via the first circuit assembly C1 and the second circuit assembly C2.

In this embodiment, the immovable part I includes a case 110 and a bottom 120. The movable part M includes a frame 130 and a holder 140. The elastic assembly E includes a first elastic element 150, a second elastic element 160, and a plurality of third elastic elements 170. The drive assembly D includes an AF coil 180, a plurality of OIS coils 190, and a plurality of magnetic elements 200. The first circuit assembly C1 includes a first circuit element 230, a second circuit element 240, and a third circuit element 250. The description is merely an example, and the elements may be added to or removed as needed. Also, for clear illustration, some elements may be omitted in the drawings.

The case 110 is located above the bottom 120. The case 110 may be connected to the bottom 120, so that a receiving space is formed between the case 110 and the bottom 120. The receiving space of the immovable part I may accommodate and protect the movable part M, the elastic assembly E, the drive assembly D, the sensing assembly S, the first circuit assembly C1, and the second circuit assembly C2, and the like to strengthen the structural strength of the overall optical element drive mechanism 100. The case 110 includes a top wall 111 and a plurality of sidewalls 112. The top wall 111 is perpendicular to the main axis MA. The side walls 112 extend from the edge of the top wall 111 along the main axis MA. The bottom 120 has an opening 19-71. The sidewalls 112 of the case 110 are connected to the bottom 120 and the space formed therein may accommodate the movable part 19-P2, the drive assembly D, and the sensing assembly 19-80, and the like.

Figure 9:
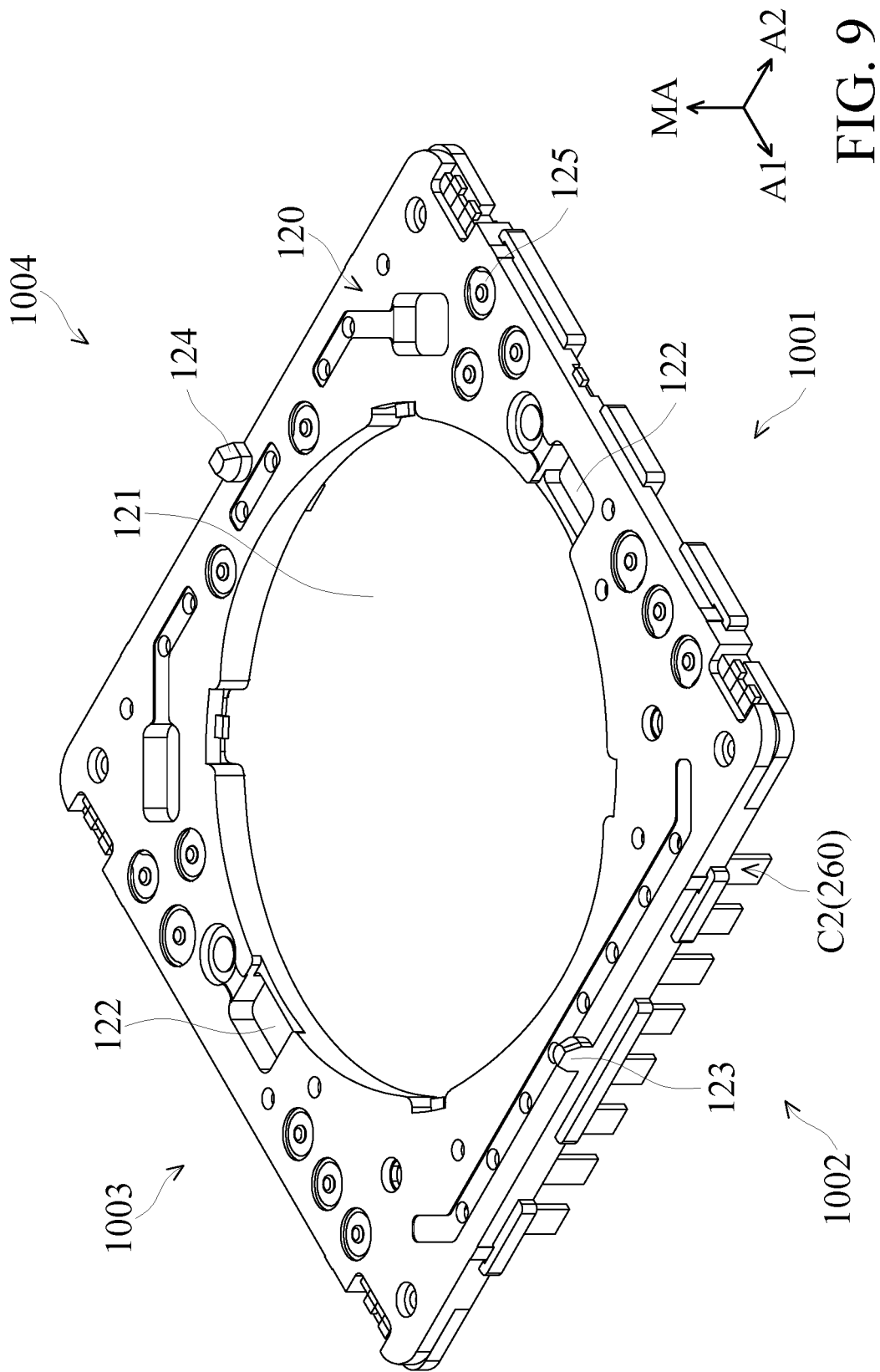
FIG. 9 and FIG. 10 are perspective views of the bottom and the second circuit assembly from different perspectives.
Figure 10:
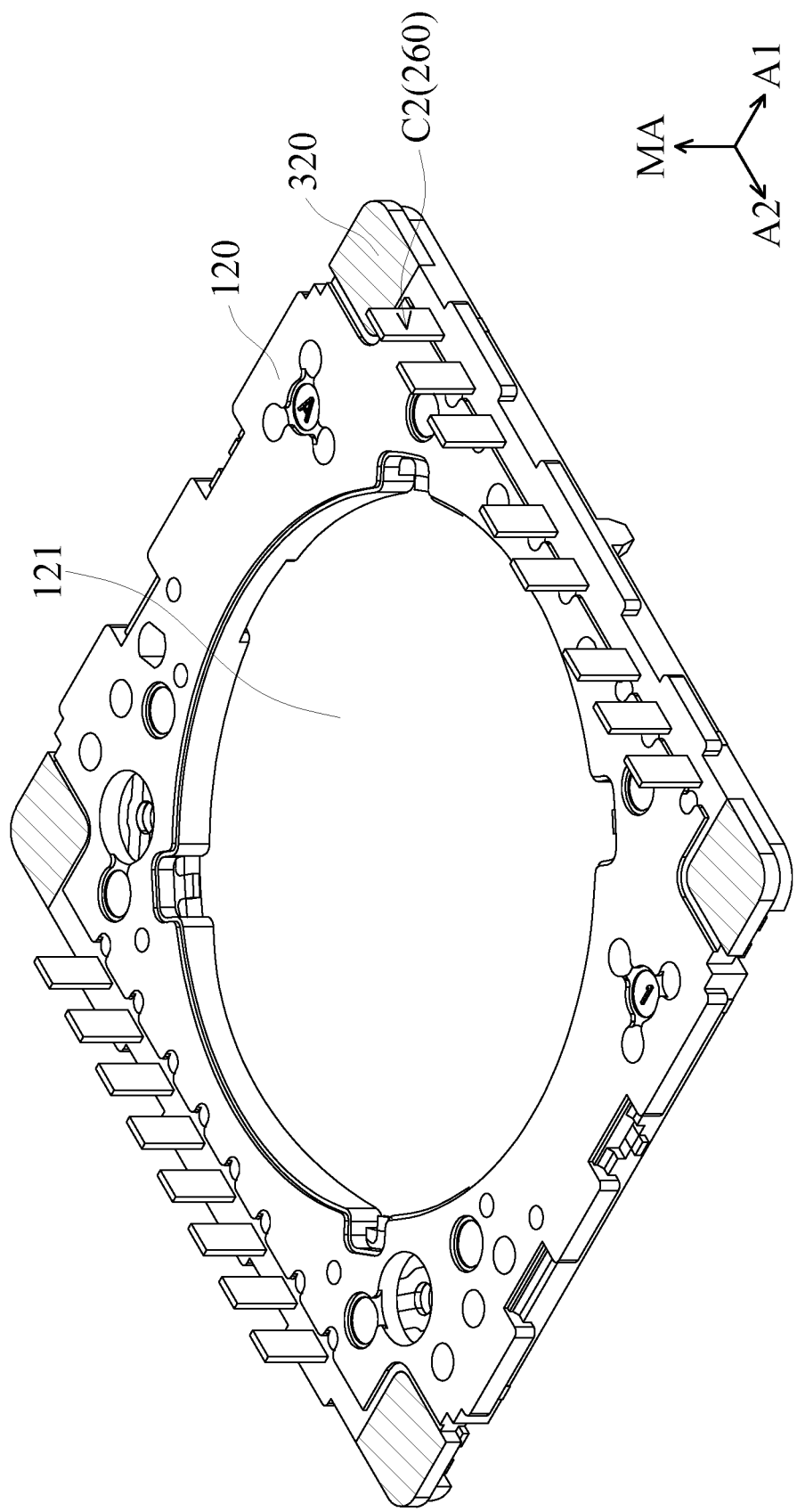
Figure 11:
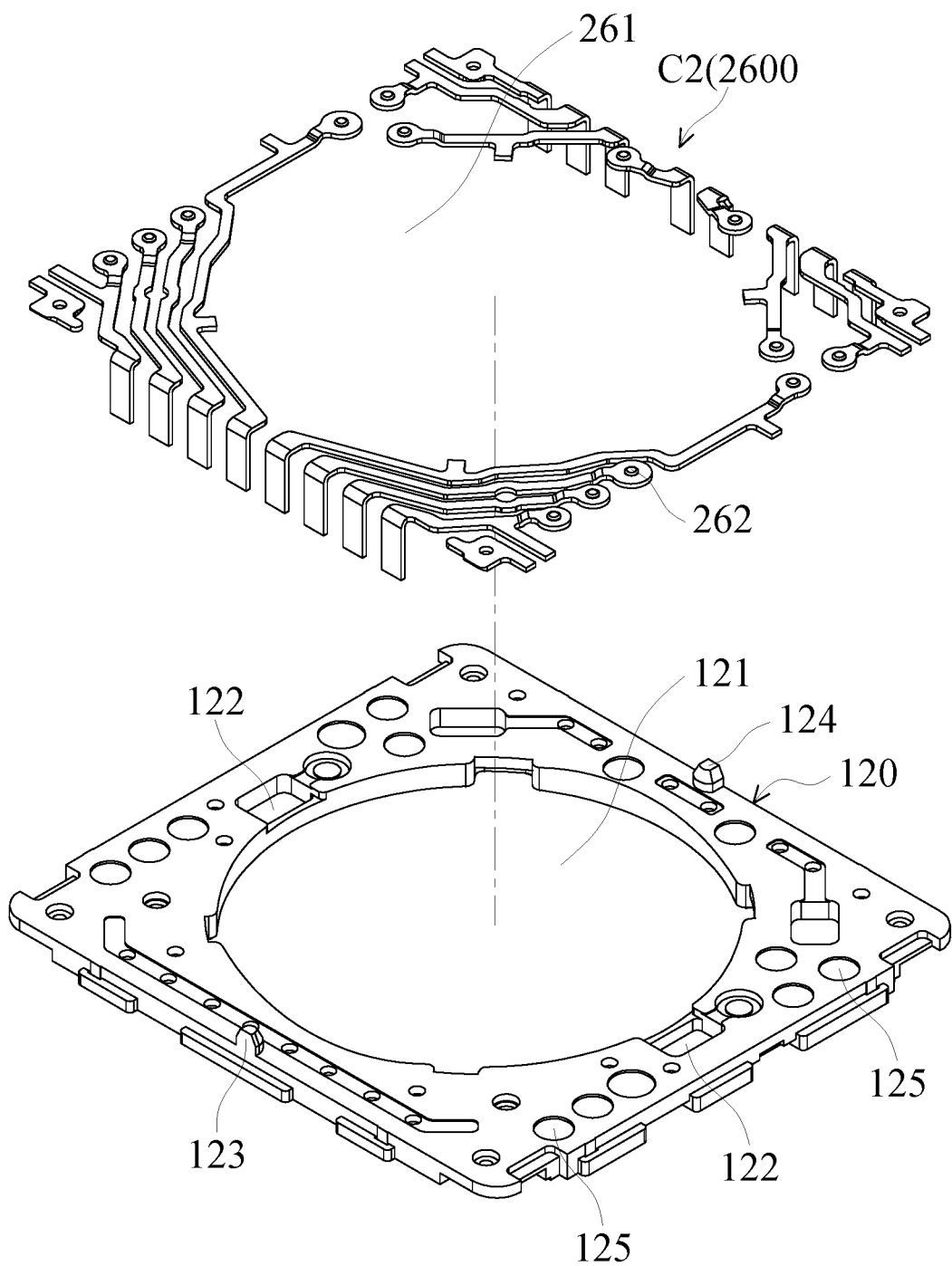
FIG. 11 is an exploded view of the bottom and the second circuit assembly.
Figure 12:
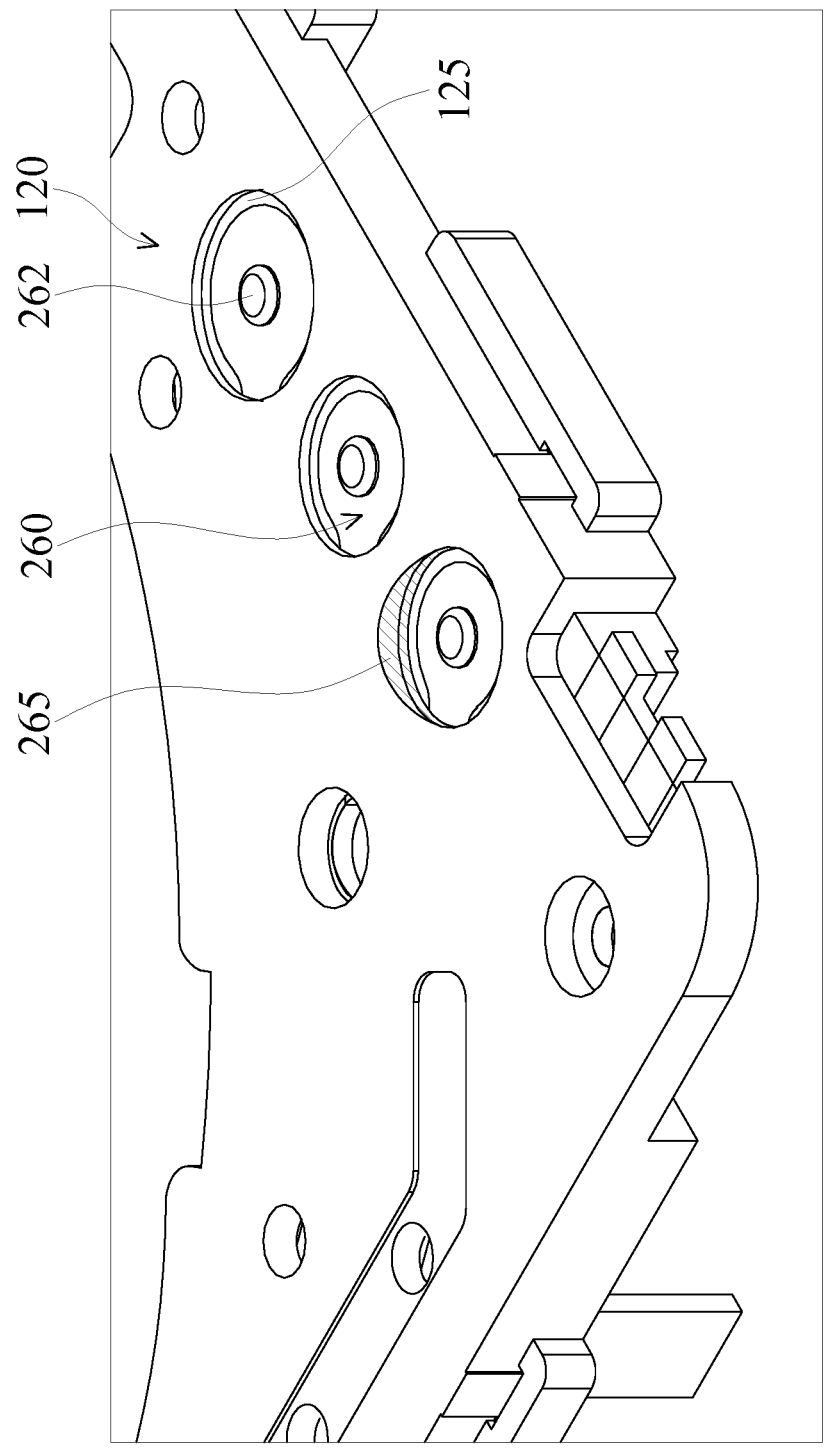
FIG. 12 is an enlarged view of part of the bottom and the second circuit assembly.

Next, in addition to FIG. 3 to FIG. 6, please also refer to FIG. 9 to FIG. 12 to know the bottom 120. FIG. 9 and FIG. 10 are perspective views of the bottom 120 and the second circuit assembly C2 from different perspectives. FIG. 11 is an exploded view of the bottom 120 and the second circuit assembly C2. FIG. 12 is an enlarged view of part of the bottom 120 and the second circuit assembly C2. The bottom 120 includes a bottom opening 121, a plurality of bottom recesses 122, a first positioning element 123, a second positioning element 124, and a plurality of bottom notches 125. The light may pass through the bottom opening 121. The bottom opening 121 communicates with the bottom recesses 122. The bottom recesses 122 are formed on the surface of the bottom 120. The bottom recesses 122 have concave structures. The bottom recesses 122 are located on the mechanism first side 1001 and the mechanism third side 1003. The first positioning element 123 is located on the mechanism second side 1002, and the second positioning element 124 is located on the mechanism fourth side 1004. The first positioning element 123 and the second positioning element 124 correspond to the first circuit assembly C1. Specifically, the first positioning element 123 and the second positioning element 124 are able to position the first circuit assembly C1. The first positioning element 123 and the second positioning element 124 are arranged along the first axis A1. The bottom notches 125 are formed on the surface of the bottom 120. The bottom notches 125 have concave structures and correspond to an electrical contact 265 (will be described in the followings). The bottom opening 121 and the bottom notches 125 are separate. That is, the bottom opening 121 does not communicate with the bottom notches 125.

Figure 7:
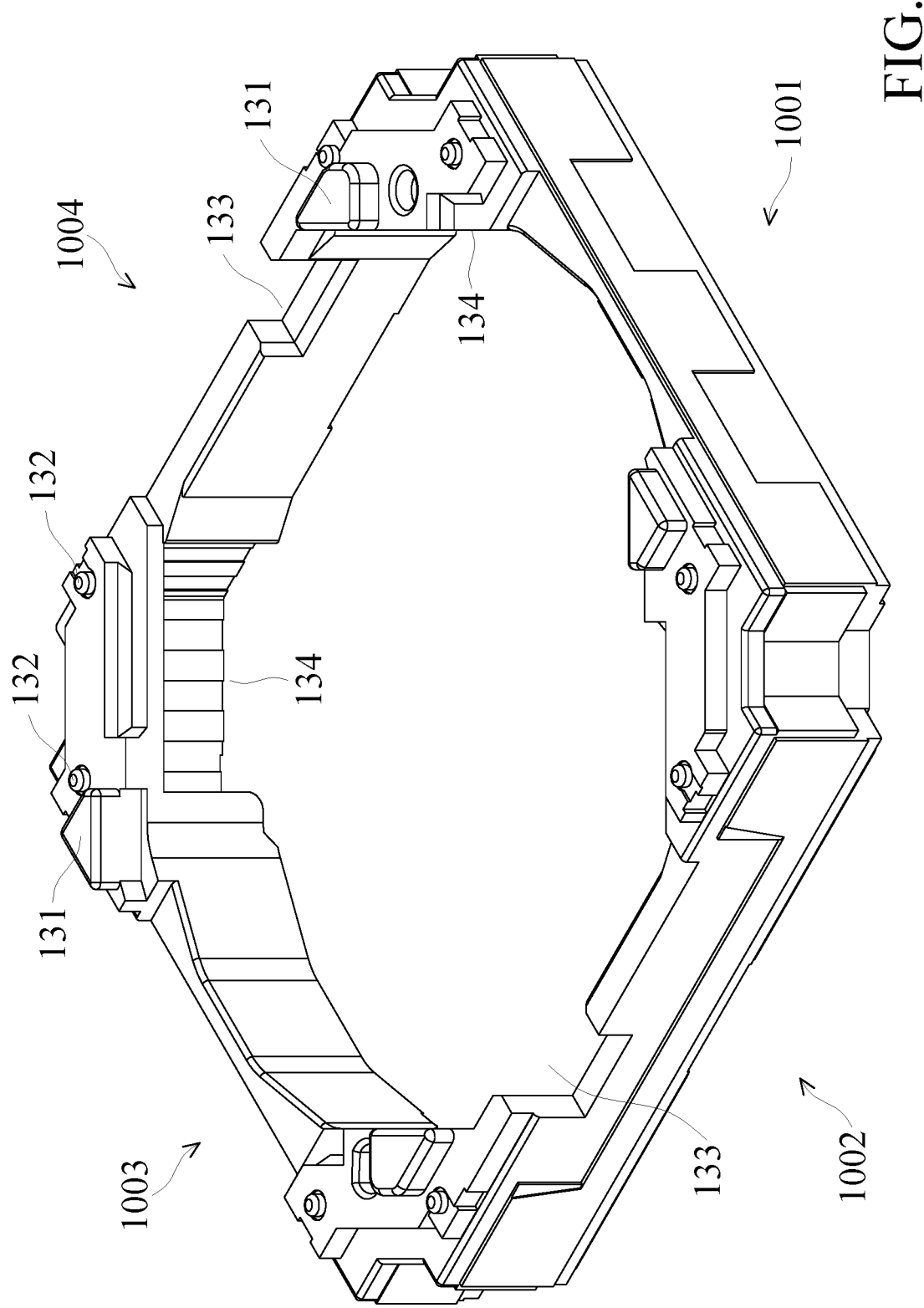
FIG. 7 is a perspective view of the frame.
Figure 8:
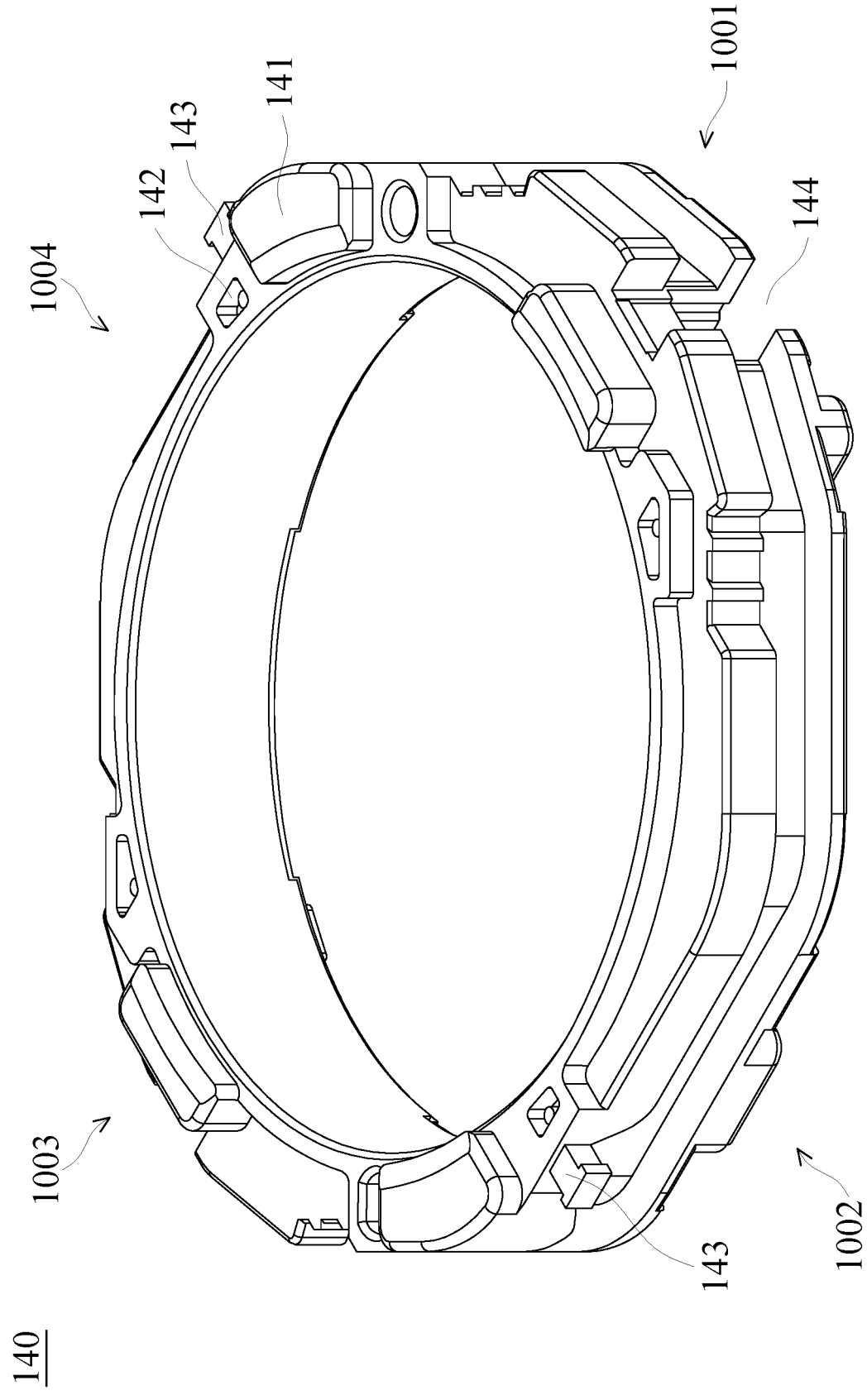
FIG. 8 is a perspective view of the holder.

Next, in addition to FIG. 3 to FIG. 6, please also refer to FIG. 7 and FIG. 8 to know the movable part M. FIG. 7 is a perspective view of the frame 130. FIG. 8 is a perspective view of the holder 140. When viewed from the main axis MA, the mechanism first side 1001 and the mechanism third side 1003 are located on the opposite sides of the movable part M, and the mechanism second side 1002 and the mechanism fourth side 1004 are located on the opposite sides of the movable part M. The frame 130 and the holder 140 are located in the receiving space of the immovable part I. The frame 130 includes a plurality of frame stopper-portions 131, a plurality of frame connection portions 132, a plurality of frame recesses 133, and a plurality of frame receiving portions 134. The frame stopper-portions 131 and the frame connection portions 132 are disposed on the top surface of the frame 130. The frame stopper-portions 131 and the frame connection portions 132 may be protrusions. The frame recesses 133 are formed on the mechanism second side 1002 and the mechanism fourth side 1004. The frame receiving portions 134 are formed in the four corners inside the frame 130 to accommodate and protect the magnetic elements 200.

The holder 140 is disposed inside the frame 130. The holder 140 is connected to the frame 130 via the first elastic element 150 and the second elastic element 160. The holder 140 is hollow to hold the optical element 10. The holder 140 includes a plurality of holder stopper-portions 141, a plurality of holder connection portions 142, a plurality of holder electrical connection portions 143, and a plurality of holder recesses 144. The holder stopper-portions 141 and the holder connection portions 142 are disposed on the top surface of the holder 140. The holder stopper-portions 141 and the holder connection portions 142 may be protrusions. The holder electrical connection portions 143 are located on the mechanism second side 1002 and the mechanism fourth side 1004. The holder recesses 144 are located on the mechanism first side 1001 and the mechanism third side 1003. Since the holder electrical connection portions 143 and the holder recesses 144 are located on the different sides of the optical element drive mechanism 100, the space may be utilized effectively, and miniaturization may be achieved.

When the drive assembly D drives the holder 140 to move along the optical axis O toward the top wall 111 of the case 1100 and to reach the limit, the frame stopper-portions 131 and the holder stopper-portions 141 may be in contact with the top wall 111 of the case 110 first so as to prevent the rest of the portions of the frame 130 and the holder 140 from colliding with the case 110. Similar stopper-portions may also be placed on the bottom surface of the frame 130 and the bottom surface of the holder 140. Therefore, the stability of the overall optical element drive mechanism 100 is enhanced.

Next, please refer to FIG. 3, FIG. 4, FIG. 7, and FIG. 8 to know the elastic assembly E. The first elastic element 150 is disposed between the top wall 111 of the case 110 and the frame 130. The second elastic element 160 is disposed between the holder 140 and the first circuit assembly C1. The first elastic element 150 and the second elastic element 160 are made of an elastic material or a ductile material, such as metal. In this technical field, the first elastic element 150 and the second elastic element 160 may be known as "spring", "leaf spring", "plate spring", etc.

The first elastic element 150 is connected to the top surface of the frame 130 and the top surface of the holder 140, and the second elastic element 160 is connected to the bottom surface of the frame 130 and the bottom surface of the holder 140. For example, the first elastic element 150 may be disposed on the frame connection portion 132 and the holder connection portion 142. When the movable part M is driven to move relative to the immovable part I, the holder 140 is held between the first elastic element 150 and the second elastic element 160, so that the range of motion of the holder 140 is restricted. Therefore, the holder 140 and the optical element 10 therein are prevented from being damaged because of collision with the case 110 or the bottom 120 when the optical element driving mechanism 100 moves or is impacted.

The upper ends the third elastic elements 170 are connected to the first elastic element 150 of the elastic assembly E, and the lower ends of the third elastic elements 170 are connected to the four corners of the bottom 120 of the immovable part I. As described above, the first elastic element 150 is connected to the frame 130 of the movable part M and the holder 140 of the movable part M. Therefore, the third elastic elements 170 essentially "suspend" the frame 130 together with the holder 140 of the movable part M between the case 110 and the bottom 120 of the immovable part M, so that the frame 130 and the holder 140 are both separated by a distance apart from the case 110 and the bottom 120. That is, the frame 130 and the holder 140 are not in direct contact with the case 110 and the bottom 120. The first elastic element 150 and the third elastic element 170 are both electrically connected to the drive assembly D. With the flexible third elastic elements 170, the movement of the frame 130 of the movable part M together with the holder 140 therein relative to the case 110 of the immovable part M and the bottom 120 of the immovable part M are mostly two-dimensional in directions that are perpendicular to the optical axis O.

Next, please refer to FIG. 3 to FIG. 6 to know the drive assembly D. The drive assembly D is able to drive the movable part M to move, including linear motion, rotation, etc. The AF coil 180 is polygonal, surrounding the holder 140. The AF coil 180 includes a plurality of electrical connection leads 181. The electrical connection leads 181 are the portion of the AF coil 180 that extend from the AF coil 180 and surround the holder electrical connection portions 143. By methods such as soldering on the holder electrical connection portions 143, the AF coil 180 may be electrically connected to other elements, e.g. the first elastic element 150. For example, the current may be applied to the AF coil 180 via one of the electrical connection leads 181, and the current may flow out the AF coil 180 via the other one of the electrical connection leads 181. The OIS coils 190 are disposed in the first circuit assembly 190. Specifically, the OIS coils 190 may be disposed in at least one of the first circuit element 230, the second circuit element 240, and the third circuit element 250. The magnetic elements 200 are disposed at the frame receiving portions 134 of the frame 130. Every pair of magnetic poles (i.e. a pair of north magnetic pole and south magnetic pole) of the magnetic elements 200 is arranged along a direction that is perpendicular to the main axis MA.

When the current is supplied to the drive assembly D, magnetic force that is parallel with the optical axis O is generated between the AF coil 180 and the magnetic elements 200. The holder 140 and the optical element 10 therein may be driven to move in a direction that is parallel with the optical axis O, so the optical element 10 inside the holder 140 may make an object to be in focus to achieve auto focus (AF). Therefore, the quality of the images is enhanced. When the current is supplied to the drive assembly D, magnetic force that is perpendicular to the optical axis O is generated between the OIS coils 190 and the magnetic elements 200. The frame 130 together with the holder 140 and the optical element 10 therein may be driven to move in a direction that is perpendicular to the optical axis O to compensate for a deviation in the image caused by shaking or being impacted, and to solve the problem of blurry images and videos, thereby achieve optical image stabilization (OIS).

AF and OIS may enhance the image quality. It should be noted that the magnetic elements 200 correspond to the AF coil 180 and the OIS coils 190 at the same time. In other words, for the drive assembly D, only one set of magnetic elements 200 is needed to achieve both AF and OIS. Since there is no need for placing two sets of magnetic elements 200 to correspond to the AF coil 180 and the OIS coils 190, respectively, miniaturization may be achieved.

Next, please refer to FIG. 3 to FIG. 6 to know the sensing assembly S. The reference elements 210 are disposed in the holder recesses 144, corresponding to the bottom recesses 122. The sensing elements 220 correspond to the reference elements 210. The sensing elements 220 are disposed on the top surface of the first circuit element 230. Each of the reference elements 210 may be a magnetic element. Each of the sensing elements 220 may be a Hall sensor, a Giant Magneto Resistance (GMR) sensor, a Tunneling Magneto Resistance (TMR) sensor, etc. The sensing elements 220 may detect the reference elements 210 to find out the position of the movable part M. In particular, the sensing elements 220 may detect the change of the lines of magnetic field (including but not limited to the density of the lines of magnetic field and the direction of the lines of magnetic field) of the reference elements 210 to find out the position of the holder 140. Due to the sensing assembly S, the position of the movable part M may be known in a short period of time.

In this embodiment, the sensing assembly S includes two reference elements 210 and four sensing elements 220 to sense the movement of the holder 140 along the first axis A1 and the second axis A2 relative to the bottom 140 and shake, rotation, and the like of the holder 140. However, the number and the positions of the reference elements 210 and the sensing elements 220 may be adjusted as needed.

Next, please refer to FIG. 3 and FIG. 9 to FIG. 12 to know the second circuit assembly C2. In this embodiment, the second circuit assembly C2 includes terminals for external connection, and thus the second circuit assembly C2 may also be referred to as an external connection circuit 260. In particular, the first circuit assembly C1 is electrically connected to an external circuit via the external connection circuit 260. Thanks to the external connection circuit 260, the current may be supplied into the optical element drive mechanism 100. The external connection circuit 260 may include several pins, so that the current may flow in and out.

The external connection circuit 260 is disposed below the first circuit assembly C1, and the external connection circuit 260 faces the bottom surface of the first circuit assembly C1. The external connection circuit 260 may be formed in the bottom 120 by methods such as insert molding. That is, the external connection circuit 260 and the bottom 120 may be formed integrally as one piece, and at least part of the external connection circuit 260 is embedded in the bottom 120 and not revealed from the bottom 120.

The external connection circuit 260 includes an external connection circuit opening 261 and a plurality of projecting portions 262. The light passes through the external connection circuit opening 261. When viewed from the main axis MA, the area of the external connection circuit opening 261 is greater than the area of the bottom opening 121. The external connection circuit opening 261 communicates with the bottom recesses 122. The external connection circuit opening 261 and the bottom notches 125 are separate. That is, the external connection circuit opening 261 does not communicate with the bottom notches 125. The projecting portions 262 protrude from the bottom notches 125.

The electrical contact 265 (only schematically illustrated in FIG. 12) may be included between the first circuit assembly C1 and the second circuit assembly C2. For ease of illustration, only one electrical contact 265 is illustrated in FIG. 12, but there may be more electrical contacts 265. The electrical contact 265 is located between the bottom surface of the first circuit element 230 and the top surface of the external connection circuit 260. The electrical contact 265 may include a conductive material. The conductive material may a material that makes elements electrically connected to each other, such as metal (e.g. Tin). The conductive material may be disposed on the projection portions 262 in the bottom notches 125, so that the first circuit assembly C1 and the second circuit assembly C2 are electrically connected to each other via the electrical contact 265.

Figure 13:
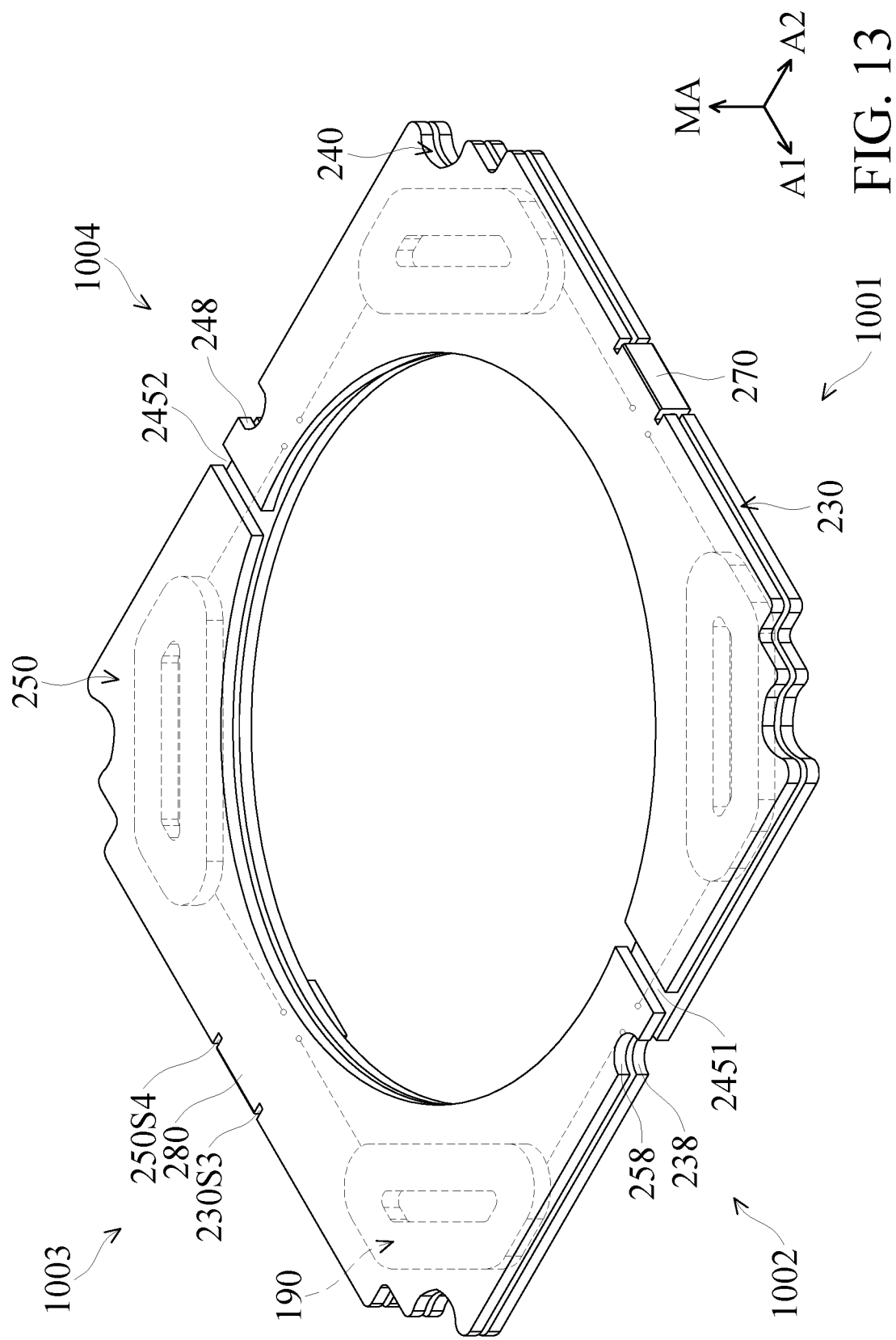
FIG. 13 and FIG. 14 are perspective views of the first circuit assembly from different perspectives.
Figure 14:
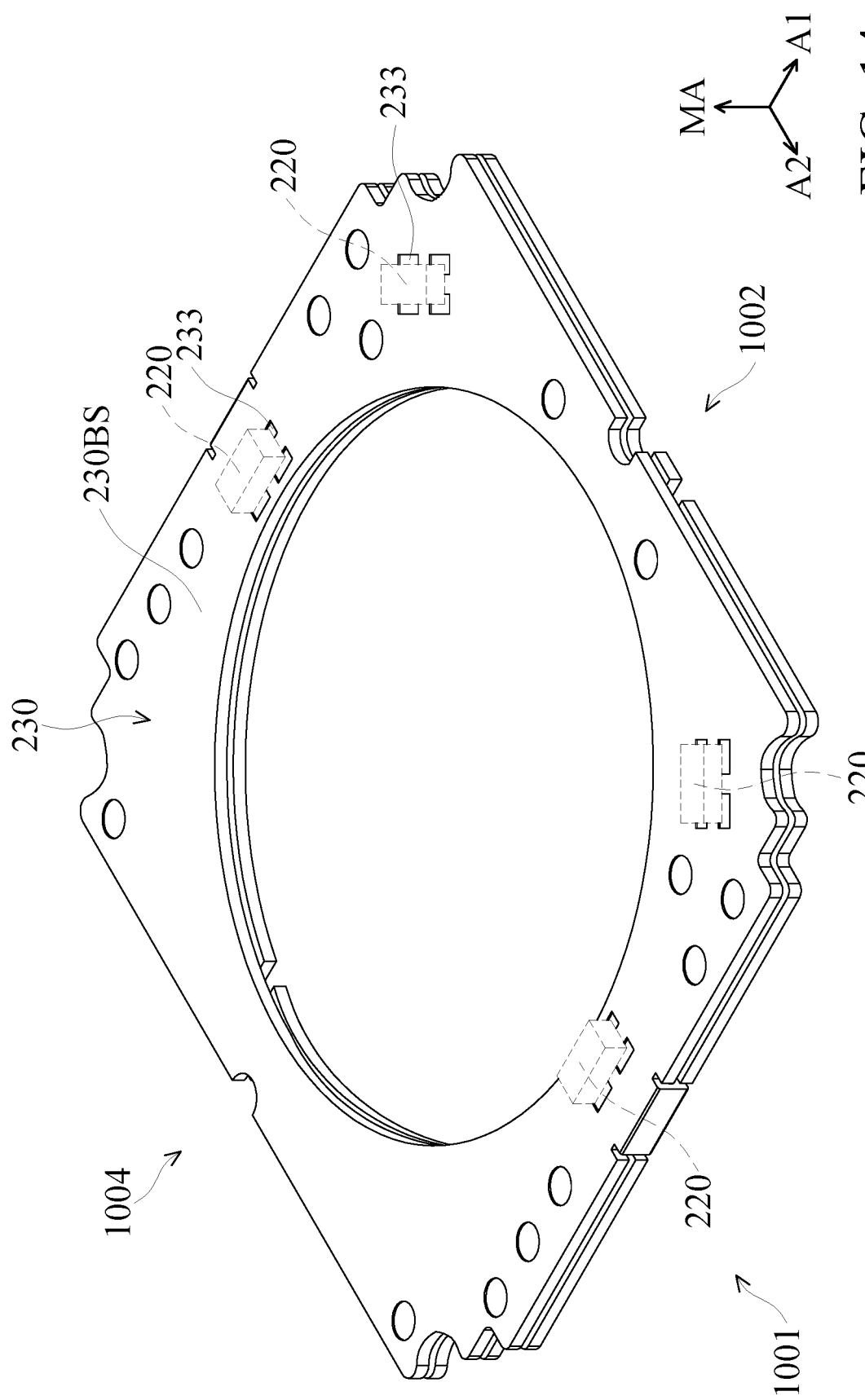
Figure 15:
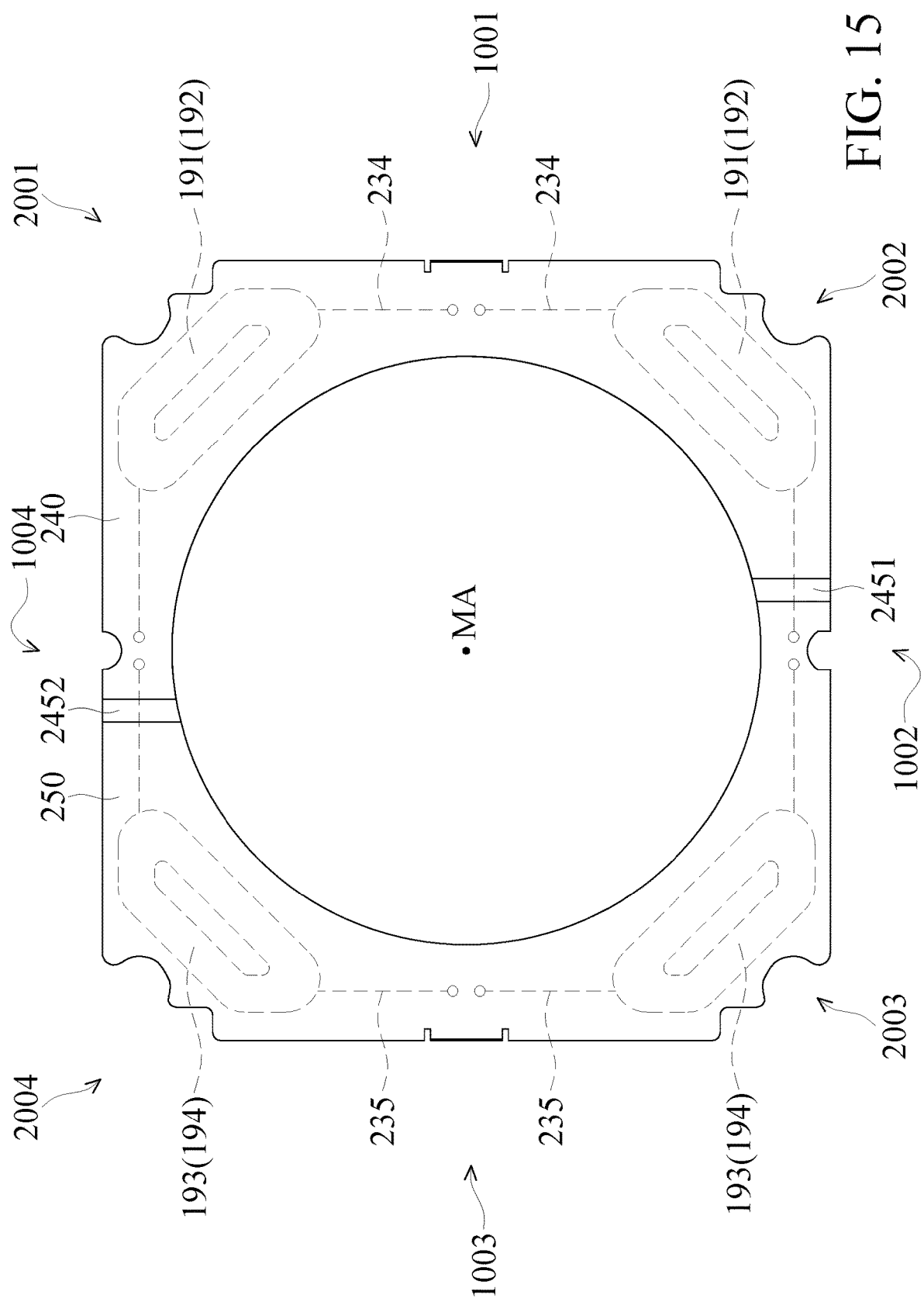
FIG. 15 is a top view of the first circuit assembly.
Figure 16:
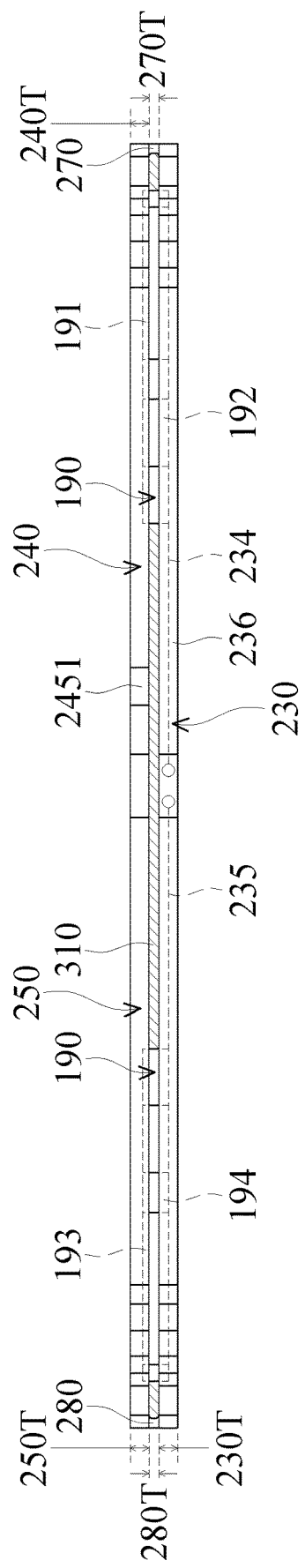
FIG. 16 is a side view of the first circuit assembly.
Figure 17:
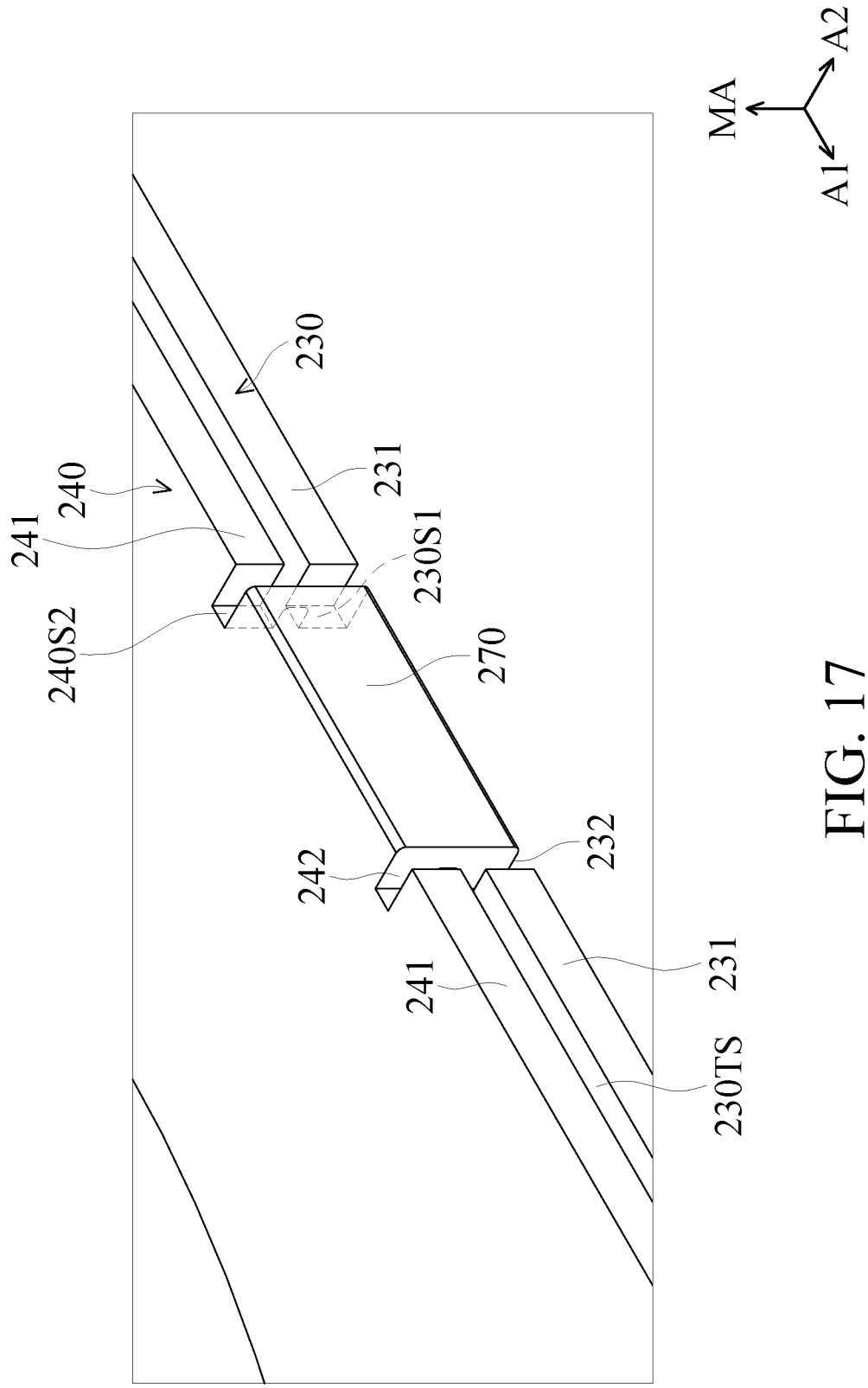
FIG. 17 and FIG. 18 are enlarged views of part of the first circuit assembly from different perspectives.
Figure 18:
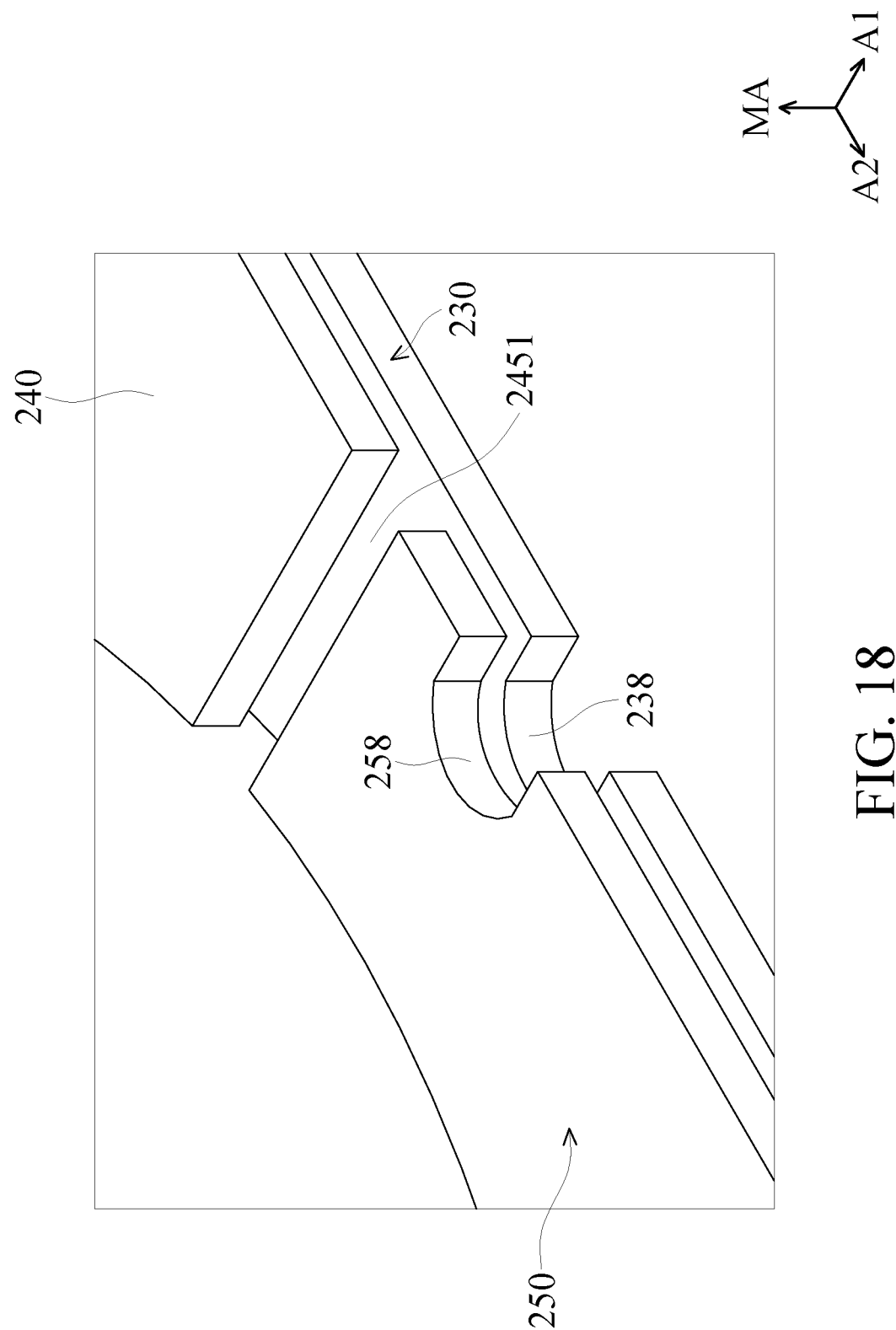
Figure 19:
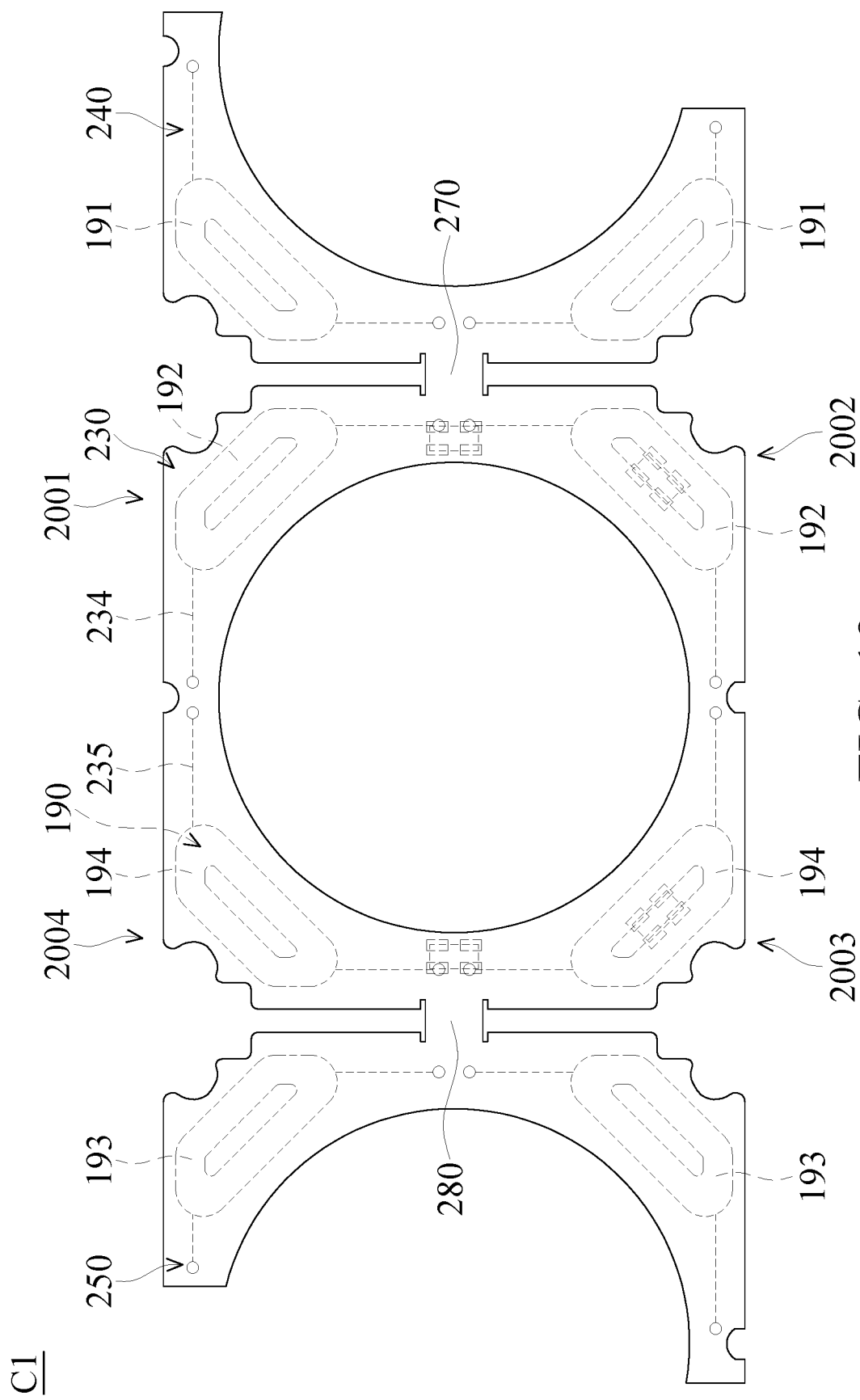
FIG. 19 is a schematic view of the first circuit assembly when it has not been folded yet.

Next, please refer to FIG. 13 to FIG. 19 to know the first circuit assembly C1. FIG. 13 and FIG. 14 are perspective views of the first circuit assembly C1 from different perspectives. FIG. 15 is a top view of the first circuit assembly C1. FIG. 16 is a side view of the first circuit assembly C1. FIG. 17 and FIG. 18 are enlarged views of part of the first circuit assembly C1 from different perspectives. FIG. 19 is a schematic view of the first circuit assembly C1 when it has not been folded yet. In the present disclosure, the first circuit assembly C1 may be formed by folding. At the folding positions, the first circuit assembly C1 includes a first connection portion 270 and a second connection portion 280. In other words, the folding process is done twice to form the first circuit assembly C1.

Since the first circuit assembly C1 may be formed by folding, there is no need to place a separate circuit board. Since there is no need for a separate circuit board, there is no need to place the conductive material that is used for electrical connections between the circuit board and other elements. Therefore, the amount of the elements may be reduced, the manufacturing process is simplified, the cost is reduced, and the like.

The first circuit element 230, the second circuit element 240, and the third circuit element 250 all have plate-like structures, and the first circuit element 230, the second circuit element 240, and the third circuit element 250 are perpendicular to the main axis MA. The second circuit element 240 and the third circuit element 250 are disposed above the first circuit element 230. When viewed from the main axis MA, the first circuit element 230 and the second circuit element 240 at least partially overlap. When viewed from the main axis MA, the first circuit element 230 and the third circuit element 250 at least partially overlap. When viewed from the main axis MA, the second circuit element 240 and the third circuit element 250 do not overlap. When viewed from the second axis A2, the second circuit element 240 and the third circuit element 250 at least partially overlap. That is, the second circuit element 240 and the third circuit element 250 are arranged along the second axis A2.

The first circuit element 230 includes a first side 230S1 (as shown in FIG. 17) and a third side 230S2 (only schematically denoted in FIG. 17, the exact position may be referred to the first side 230S1 of the first circuit element 230). When viewed from the main axis Ml, the first side 230S1 of the first circuit element 230 is located on the mechanism first side 1001, and the third side 230S3 of the first circuit element 230 is located on the mechanism third side 1003.

The second circuit element 240 includes a second side 240S2 (as shown in FIG. 17). When viewed from the main axis Ml, the second side 240S2 of the second circuit element 240 is located on the mechanism first side 1001. The third circuit element 250 includes a fourth side 250S4 (only schematically denoted in FIG. 17, the exact position may be referred to the second side 240S2 of the second circuit element 240). When viewed from the main axis Ml, the fourth side 250S4 of the third circuit element 250 is located on the mechanism third side 1003.

The first connection portion 270 is located on the mechanism first side 1001. In particular, the first connection portion 270 protrudes from the first side 230S1 of the first circuit element 230 and the second side 240S2 of the second circuit element 240. The first connection portion 270 is connected to the first circuit element 230 and the second circuit element 240. The first circuit element 230 is electrically connected to the second circuit element 240 via the first connection portion 270. In the drawings, the outer surface of the first connection portion 270 is flat, so that the first connection portion 270 has a plate-like structure. However, the first connection portion 270 may have a bent structure.

The second connection portion 280 is located on the mechanism third side 1003. In particular, the second connection portion 280 protrudes from the third side 230S3 of the first circuit element 230 and the fourth side 250S4 of the third circuit element 250. The second connection portion 280 is connected to the first circuit element 230 and the third circuit element 250. The first circuit element 230 is electrically connected to the third circuit element 250 via the second connection portion 280. In the drawings, the outer surface of the second connection portion 280 is flat, so that the second connection portion 280 has a plate-like structure. However, the second connection portion 280 may have a bent structure.

When viewed from the main axis MA, a first space 2451 and a second space 2452 are formed between the second circuit element 240 and the third circuit element 250. The first space 2451 is located on the mechanism second side 1002. The second space 2452 is located on the mechanism fourth side 1004. When viewed from the main axis MA, the connecting line between the center of the first space 2451 and the center of the second space 2452 is neither parallel with nor perpendicular to the first axis A1. When viewed from the first axis A1, the first space 2451 and the second space 2452 do not overlap. When viewed from the second axis A2, the first space 2451 and the second space 2452 do not overlap. In other words, the first space 2451 and the second space 2452 are not aligned in the first axis A1. Thanks to the first space 2451 and the second space 2452, they may be the tolerance during the manufacturing and assembling, and the orientation of the first circuit assembly C1 may be identified. Therefore, the assembling process may be further simplified.

In the followings, the first circuit element 230, the second circuit element 240, and the first connection portion 270 are mainly discussed. However, the third circuit element 250 and the second connection portion 280 may have similar structures and functionalities to the second circuit element 240 and the first connection portion 270.

The first circuit element 230 includes a plurality of first protrusions 231. The first protrusions 231 protrude from the first side 230S1 of the first circuit element 230. A first gap 232 is formed between the first protrusions 231 and the first connection portion 270. In other words, the first protrusion 231 is the portion that is relatively protruding than the first gap 232, and the first gap 232 is located between the first protrusions 231 and the first connection portion 270. The second circuit element 240 includes a plurality of second protrusions 241. The second protrusions 241 protrude from the second side 240S2 of the second circuit element 240. A second gap 242 is formed between the second protrusions 241 and the first connection portion 270. In other words, the first protrusion 231 is the portion that is relatively protruding than the second gap 242, and the second gap 242 is located between the second protrusions 241 and the first connection portion 270.

When viewed from the main axis MA, the first protrusions 231 and the second protrusions 241 at least partially overlap. When viewed from the main axis MA, the first gap 232 and the second gap 242 at least partially overlap. Thanks to the first gap 232 and the second gap 242 formed on the two sides of the first connection portion 270, an allowable amount of variation of a specified quantity of space is generated, thereby utilizing the folding process.

Since the first connection portion 270 is formed because of the folding process, the first circuit element 230, the second circuit element 240, and the first connection portion 270 are formed integrally as one piece. The first circuit element 230 is connected to the first connection portion 270 without the need for connective techniques such as adhesion or welding. The second circuit element 240 is connected to the first connection portion 270 without the need for connective techniques such as adhesion or welding.

For ease of illustration, the bottom surface of the first circuit element 230 is a first surface 230BS (as shown in FIG. 14), and the top surface of the first circuit element 230 is a second surface 230TS (as shown in FIG. 17). The first surface 230BS is opposite the second surface 230TS. The first surface 230BS faces the external connection circuit 260. The second surface 230TS faces the second circuit element 240.

The first circuit element 230 may further include a first circuit 233 (as shown in FIG. 14), a second circuit 234, a third circuit 235, and a substrate 236 (as shown in). At least part of the first circuit 233, the second circuit 234, and the third circuit 235 are embedded in the substrate 236 and not revealed from the substrate 236. That is, the substrate 236 may be the portion of the first circuit element 230 that covers the first circuit 233, the second circuit 234, and the third circuit 235.

The first circuit 233 is electrically connected to the sensing elements 220. Specifically, the sensing elements 220 are disposed on the first surface 230BS of the first circuit element 230. For example, the sensing elements 220 are disposed on the first surface 230BS of the first circuit element 230 by methods such as surface mount technology (SMT). In some embodiments, part of the first circuit 233 is revealed from the first surface 230BS of the first circuit element 230 for facilitating the electrical connection between the sensing elements 220 and the first circuit 233. In some embodiments, there is no need to apply an adhesive between the sensing elements 220 and the first circuit 233.

Next, how the OIS coils 190 of the drive assembly D are placed in the first circuit assembly C1 is described. For ease of illustration, the OIS coils 190 are defined as including a first coil 191, a second coil 192, a third coil 193, and a fourth coil 194. The first coil 191 is disposed in the second circuit element 240. The second coil 192 and the fourth coil 194 are disposed in the first circuit element 230. The third coil 193 is disposed in the third circuit element 250.

The first coil 191 is electrically connected to the second coil 192 and the second circuit 234. The second circuit 234 is the portion of the second coil 192 that extends out. When viewed from the main axis MA, the first coil 191 and the second circuit 234 do not overlap. The third coil 193 is electrically connected to the fourth coil 194 and the third circuit 235. The third circuit 235 is the portion of the fourth coil 194 that extends out. When viewed from the main axis MA, the third coil 193 and the third circuit 235 do not overlap.

The first coil 191 and the second coil 192 are located on the first corner 2001 and the second corner 2002. The third coil 193 and the fourth coil 194 are located on the third corner 2003 and the fourth corner 2004. When viewed from the main axis MA, the first coil 191 and the second coil 192 at least partially overlap. When viewed from the main axis MA, the third coil 193 and the fourth coil 194 at least partially overlap. The first coil 191 and the third coil 193 are electrically independent. When viewed from the main axis MA, the first coil 191 and the third coil 193 do not overlap. The first coil 191 and the second coil 192 may constitute a single OIS coil 190. The third coil 193 and the fourth coil 194 may constitute a single OIS coil 190.

In some embodiments, the thickness 230T of the first circuit element 230 and the thickness 240T of the second circuit element 240 are both greater than the thickness 270T of the first connection portion 270 and the thickness 280T of the second connection portion 280. In some embodiments, the thickness 250T of the third circuit element 250 is identical to the thickness 240T of the second circuit element 240. In some embodiments, the thickness 230T of the first circuit element 230 is identical to the thickness 240T of the second circuit element 240. In some embodiments, the thickness 270T of the first connection portion 270 is identical to the thickness 280T of the second connection portion 280. Since either the thickness 270T of the first connection portion 270 or the thickness 280T of the second connection portion 280 is less than the thickness 230T of the first circuit element 230 and the thickness 240T of the second circuit element 240, the space that the first connection portion 270 and the second connection portion 280 occupy may be reduced, and miniaturization may be achieved.

In some embodiments, the first circuit assembly C1 further includes a base (not shown). The base has a plate-like structure. The base extends continuously in the first circuit element 230, the second circuit element 240, and the first connection portion 270. The base may be made of a flexible material, so that it may exist in the first circuit element 230, the second circuit element 240, and the first connection portion 270 at the same time, and it may be folded. In some embodiments, the base may be U-shaped that is rotated 90 degrees.

In some embodiments, the first circuit element 230 includes a plurality of positioning portions 238, the second circuit element 240 includes a positioning portion 248, and the third circuit element 250 includes a positioning portion 258 (as shown in FIG. 13). The positioning portions 238 are located on the mechanism second side 1002 and the mechanism fourth side 1004. The positioning portion 248 is located on the mechanism fourth side 1004. The positioning portion 258 is located on the mechanism second side 1002.

Specifically, the positioning portion 248 that is located on the mechanism second side 1002 and the positioning portion 258 accommodate the first positioning element 123 of the bottom 120, and the positioning portion 248 that is located on the mechanism fourth side 1004 and the positioning portion 248 accommodate the second positioning element 124 of the bottom 120. Since the first connection portion 270, the second connection portion 280, and the positioning portions 238, 248, and 258 are located on the different sides of the optical element drive mechanism 100, the space may be utilized effectively, and miniaturization may be achieved.

In some embodiments, the optical element drive mechanism 100 further includes a first adhesive element 310 (only schematically illustrated in FIG. 16). The first adhesive element 310 is disposed between the first circuit element 230 and the second circuit element 240 and/or between the first circuit element 230 and the third circuit element 250, so that the second circuit element 240 and the third circuit element 250 are immovably connected to the first circuit element 230 via the first adhesive element 310. The first adhesive element 310 is in direct contact with the top surface (the second surface 230TS) of the first circuit element 230, the second circuit element 240, and the first connection portion 270. Therefore, the connection between the first circuit element 230 and the second circuit element 240 and/or between the first circuit element 230 and the third circuit element 250 is strengthened.

Also, to strengthen the connection between the case 110 and the bottom 120, the optical element drive mechanism 100 may further include a second adhesive element 320 (only schematically illustrated in FIG. 10). The second adhesive element 320 is disposed on the bottom surface of the bottom 120, so that the case 110 is immovably connected to the bottom 120 via the second adhesive element 320. The second adhesive element 320 is in direct contact with the case 110 and the bottom 120. Therefore, the connection between the case 110 and the bottom 120 is strengthened.

It should be noted that, the first adhesive element 310 and the second adhesive element 320 may include same or different materials. The first adhesive element 310 and the second adhesive element 320 may be an adhesive material, a conductive material, or an insulation material, such as resin or optical adhesives. Different elements may be adhered to each other by the first adhesive element 310 and the second adhesive element 320. Furthermore, the first adhesive element 310 and the second adhesive element 320 generally have good elasticity and good covering ability and thus the first adhesive element 310 and the second adhesive element 320 may protect the elements. Additionally, the first adhesive element 310 and the second adhesive element 320 may reduce the possibilities that particles such as dust or mist enter the elements. If the first adhesive element 310 and the second adhesive element 320 are made of an insulation material, insulation may be achieved. The connection of the first circuit assembly C1 and the connection between the case 110 and the bottom 120 may be strengthened by the first adhesive element 310 and the second adhesive element 320. Therefore, the structural strength of the overall optical element drive mechanism 100 is increased.

Figure 20:
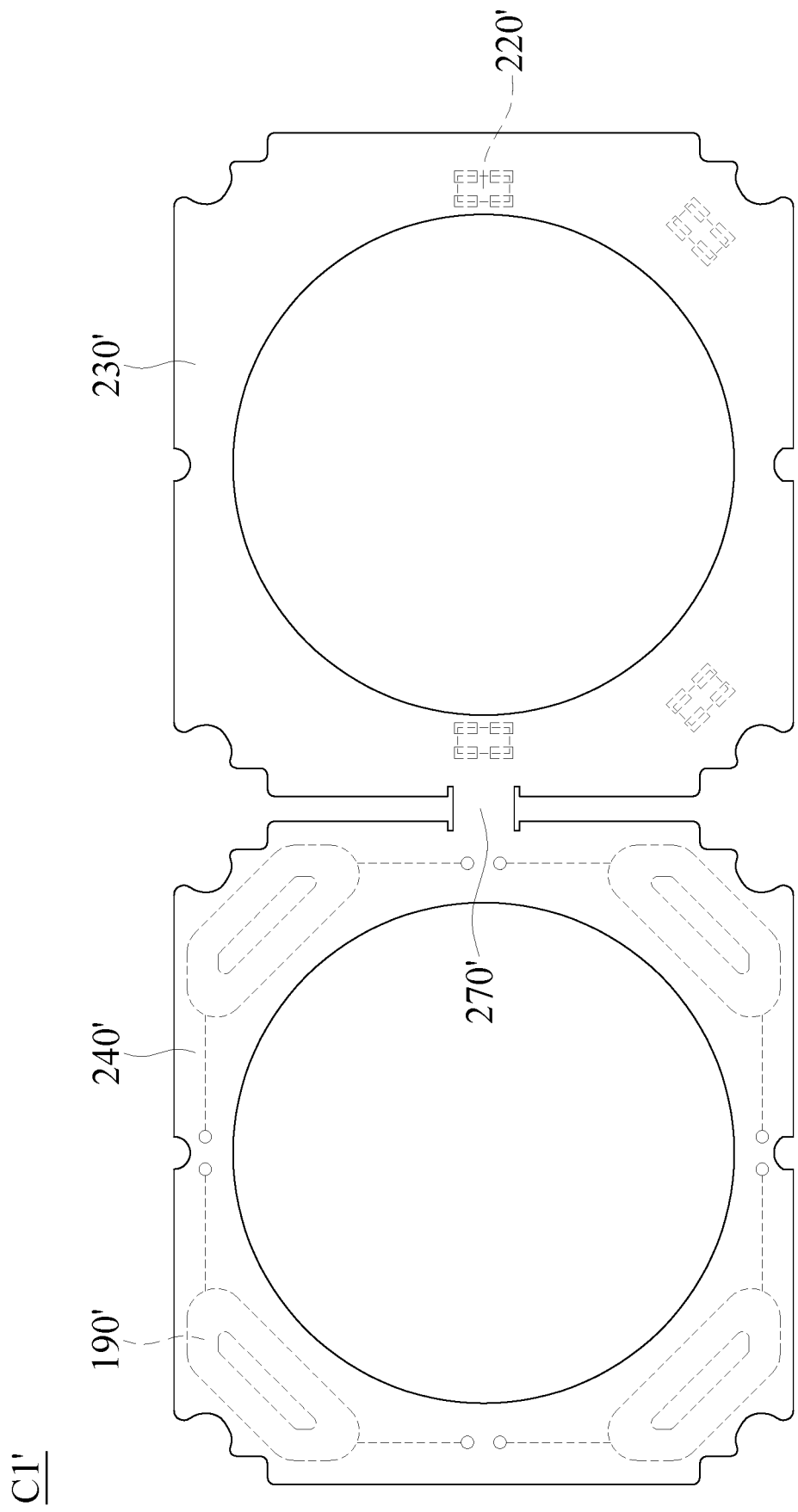
FIG. 20 is a schematic view of the first circuit assembly when it has not been folded yet according to some other embodiments.
Figure 21:
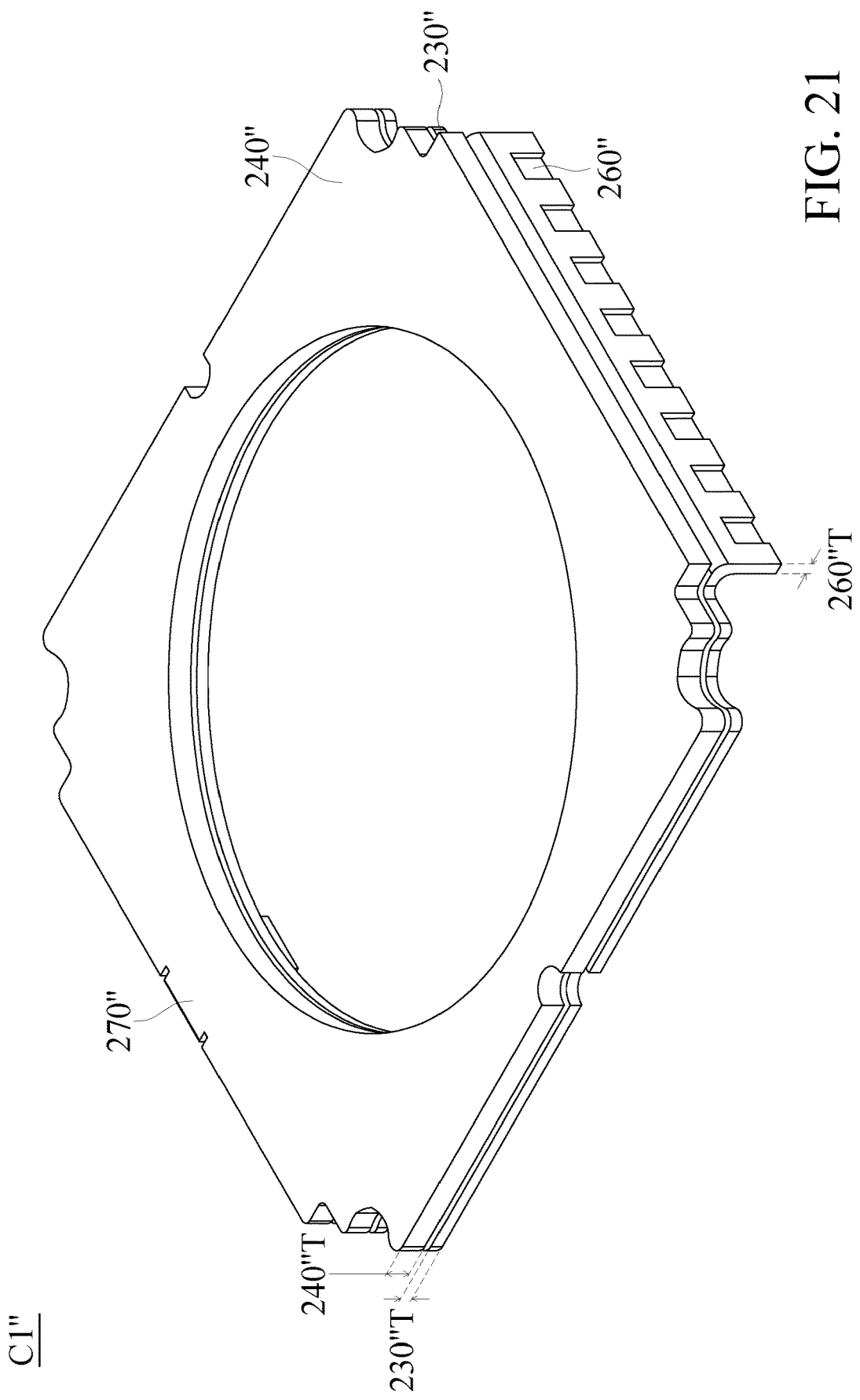
FIG. 21 is a schematic view of the first circuit assembly according to yet some other embodiments.
Figure 22:
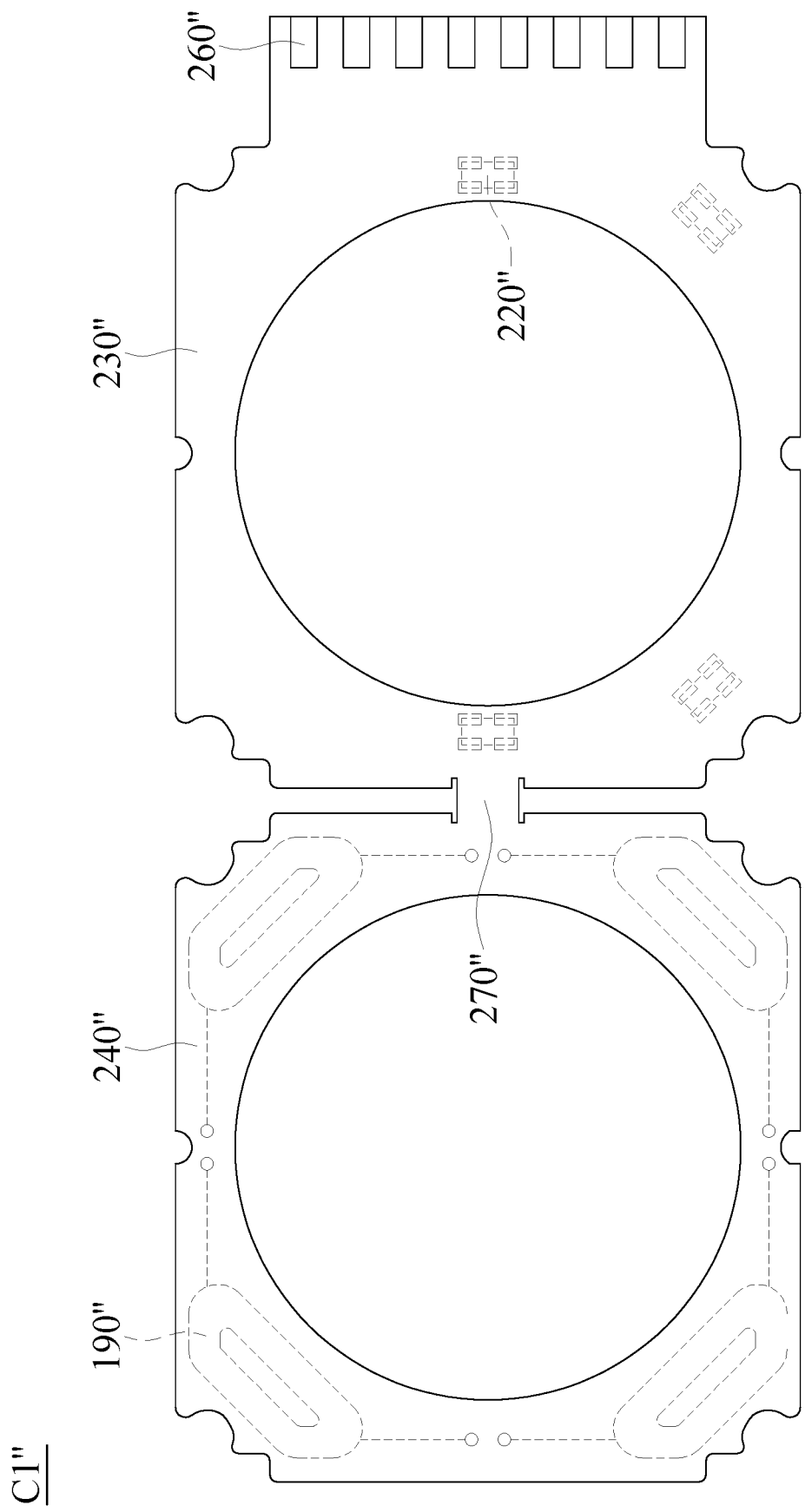
FIG. 22 is a schematic view of the first circuit assembly of FIG. 21 when it has not been folded yet.

In the following, identical or similar elements are denoted with identical or similar reference numeral. Next, please refer to FIG. 20 to FIG. 22. FIG. 20 is a schematic view of a first circuit assembly C1' when it has not been folded yet according to some other embodiments. FIG. 21 is a schematic view of a first circuit assembly C1" according to yet some other embodiments. FIG. 22 is a schematic view of the first circuit assembly C1" of FIG. 21 when it has not been folded yet.

In the embodiments as illustrated in FIG. 20, the third circuit element 250 is omitted, and the first circuit assembly C1' includes a first circuit element 230', a second circuit element 240', and a first connection portion 270'. A plurality of OIS coils 190' are disposed in the second circuit element 240'. A plurality of sensing elements 220' are disposed on the bottom surface of the first circuit element 230'. In some embodiments, the OIS coils 190 are only disposed in the second circuit element 240' and not disposed in the first circuit element 230', but is not limited thereto.

The first circuit element 230' and the second circuit element 240' both have plate-like structures, and the first circuit element 230' and the second circuit element 240' are perpendicular to the main axis MA. The second circuit element 240' is located above the first circuit element 230'. When viewed from the main axis MA, the first circuit element 230' and the second circuit element 240' at least partially overlap. In this embodiment, the first circuit element 230' is connected to the second circuit element 240' via the first connection portion 270'. In other words, the folding process is done once to form the first circuit assembly C1'.

In the embodiments as illustrated in FIG. 21 and FIG. 22, the third circuit element 250 is also omitted, similar to FIG. 20, the first circuit assembly C1" includes a first circuit element 230", a second circuit element 240", and a first connection portion 270". A plurality of OIS coils 190" are disposed in the second circuit element 240". A plurality of sensing elements 220" are disposed on the bottom surface of the first circuit element 230". The main difference is that an external connection circuit 260" (especially the terminals that used for external electrical connection) is disposed at the first circuit element 230" and not disposed in the bottom 120. The first circuit assembly C1" may be folded not only at the first connection portion 270" but also at the connection between the external connection circuit 260" and the first circuit element 230", so that the external connection circuit 260" is bent down relative to the first circuit element 230" to make the external connection circuit 260" not parallel with the first circuit element 230". In some embodiments, the external connection circuit 260" is perpendicular to the first circuit element 230".

In this embodiment, the external connection circuit 260" has a plate-like structure. In some embodiments, the thickness 260"T of the external connection circuit 260" is less than the thickness 240"T of the second circuit element 240. In some embodiments, the thickness 260"T of the external connection circuit 260 is identical to the thickness 230"T of the first circuit element 230". In some embodiments, the thickness 230"T of the first circuit element 230" is different from the thickness 240T" of the second circuit element 240". In some embodiments, the thickness 230"T of the first circuit element 230" is less than the thickness 240T" of the second circuit element 240".

As described above, the first circuit assembly C1 may include a base extending continuously in the first circuit element 230, the second circuit element 240, and the first connection portion 270. In the embodiments that the external connection circuit 260" is disposed in the first circuit assembly C1", the base may further extend to the external connection circuit 260".

It should be noted that, the folding way may be changed as needed, and the thickness, the structure, the shape, and the like of the first circuit assembly C1, C1', and C1" may be changed accordingly.

Based on the present disclosure, the circuit assembly including coils and circuits may be formed by folding. Since the circuit assembly may be formed by folding, there is no need to place a separate circuit board. Since there is no need for a separate circuit board, there is no need to place the conductive material that is used for electrical connections between the circuit board and other elements. Therefore, the amount of the elements may be reduced, the manufacturing process is simplified, the cost is reduced, and the like. Also, some features such as space, a gap, a positioning portion, and the like may be formed in the circuit assembly, to function as tolerance during the manufacturing and assembling, to facilitate the folding process, and to facilitate the positioning process. Additionally, the folding way may be changed as needed, and the thickness, the structure, the shape, and the like of the circuit assembly may be changed accordingly. Furthermore, the connection between the elements may be strengthened by the adhesive element to increase the structural strength of the overall optical element drive mechanism.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical element drive mechanism, comprising:
   an immovable part comprising a receiving space;
   a movable part connected to an optical element that comprises an optical axis, wherein the movable part is movable relative to the immovable part, and the movable part is located in the receiving space of the immovable part; and
   a drive assembly driving the movable part to move relative to the immovable part; and
   a circuit assembly electrically connected to the drive assembly, wherein the circuit assembly comprises:
   a first circuit element having a plate-like structure and perpendicular to a main axis;
   a second circuit element having a plate-like structure and perpendicular to the main axis; and
   a first connection portion connected to the first circuit element and the second circuit element;
   wherein the first circuit element is electrically connected to the second circuit element via the first connection portion;
   wherein when viewed from the main axis, the first circuit element and the second circuit element at least partially overlap;
   wherein the optical element drive mechanism is polygonal, the optical element drive mechanism comprises a mechanism first side, a mechanism second side, a mechanism third side, and a mechanism fourth side, the mechanism first side is opposite the mechanism third side, and the mechanism second side is opposite the mechanism fourth side;
   wherein the first circuit element comprises a first side, the second circuit element comprises a second side, and when viewed from the main axis, the first side of the first circuit element and the second side of the second circuit element are located on the mechanism first side;
   wherein the first connection portion protrudes from the first side of the first circuit element and the second side of the second circuit element.

2. The optical element drive mechanism as claimed in claim 1, further comprising an adhesive element, wherein the first circuit element is fixedly connected to the second circuit element via the adhesive element, and the adhesive element is in direct contact with the first circuit element, the second circuit element, and the first connection portion;
   wherein the first circuit element, the second circuit element, and the first connection portion are formed integrally as one piece;
   wherein the first circuit element is connected to the first connection portion without any connective techniques;
   wherein the second circuit element is connected to the first connection portion without any connective techniques.

3. The optical element drive mechanism as claimed in claim 1, wherein the circuit assembly further comprises a base having a plate-like structure, the base extends continuously in the first circuit element, the second circuit element, and the first connection portion.

4. The optical element drive mechanism as claimed in claim 1,
   wherein the first circuit element further comprises a first protrusion, the first protrusion protrudes from the first side of the first circuit element, and a first gap is between the first protrusion and the first connection portion;
   wherein the second circuit element comprises a second protrusion, the second protrusion protrudes from the second side of the second circuit element, and a second gap is between the second protrusion and the first connection portion;
   wherein when viewed from the main axis, the first protrusion and the second protrusion at least partially overlap;
   wherein when viewed from the main axis, the first gap and the second gap at least partially overlap.

5. The optical element drive mechanism as claimed in claim 1, wherein a thickness of the first circuit element and a thickness of the second circuit element are both greater than a thickness of the first connection portion.

6. An optical element drive mechanism, comprising:
   an immovable part comprising a receiving space;
   a movable part connected to an optical element that comprises an optical axis, wherein the movable part is movable relative to the immovable part, and the movable part is located in the receiving space of the immovable part;
   a drive assembly driving the movable part to move relative to the immovable part;
   a circuit assembly electrically connected to the drive assembly; and
   a sensing assembly sensing movement of the movable part relative to the immovable part;
   wherein the circuit assembly comprises:
   a first circuit element having a plate-like structure and perpendicular to a main axis;
   a second circuit element having a plate-like structure and perpendicular to the main axis; and a first connection portion connected to the first circuit element and the second circuit element;
wherein the first circuit element is electrically connected to the second circuit element via the first connection portion;
wherein when viewed from the main axis, the first circuit element and the second circuit element at least partially overlap;
herein the sensing assembly comprises:
a reference element; and
a sensing element corresponding to the reference element;
wherein the first circuit element comprises a first surface, a second surface, a first circuit, and a substrate, the first surface is opposite the second surface, the second surface faces the second circuit element, and at least part of the first circuit is embedded in the substrate and not revealed from the substrate;
wherein the sensing element is disposed on the first surface of the first circuit element, and the sensing element is electrically connected to the first circuit of the first circuit element.

7. The optical element drive mechanism as claimed in claim 6, wherein the circuit assembly further comprises an external connection circuit, the external connection circuit is electrically connected to the first circuit element, the external connection circuit has a plate-like structure that is not parallel with the first circuit element, and the circuit assembly is electrically connected to an external circuit via the external connection circuit;
wherein a thickness of the external connection circuit is less than a thickness of the second circuit element, the thickness of the external connection circuit is identical to a thickness of the first circuit element, and the thickness of the second circuit element is different from the thickness of the first circuit element;
wherein the circuit assembly further comprises a base having a plate-like structure;
wherein the base extends continuously in the first circuit element, the second circuit element, and the first connection portion and to the external connection circuit;
wherein the immovable part comprises a bottom, the bottom comprises a bottom opening and a bottom recess, a light passes through the bottom opening, the bottom recess is formed on a surface of the bottom, the bottom recess has a concave structure and corresponds to the sensing element, and the bottom recess communicates with the bottom opening.

8. The optical element drive mechanism as claimed in claim 7, wherein the thickness of the first circuit element is less than the thickness of the second circuit element.

9. The optical element drive mechanism as claimed in claim 6, wherein the first circuit element further comprises a second circuit, the drive assembly comprises a first coil and a second coil, the first coil is disposed in the second circuit element, the second coil is disposed in the first circuit element, and the first coil is electrically connected to the second coil and the second circuit, wherein when viewed from the main axis, the first coil and the second circuit do not overlap, wherein when viewed from the main axis, the first coil and the second coil at least partially overlap.

10. The optical element drive mechanism as claimed in claim 6, wherein the optical element drive mechanism is polygonal, the optical element drive mechanism comprises a mechanism first side, a mechanism second side, a mechanism third side, and a mechanism fourth side, the mechanism first side is opposite the mechanism third side, and the mechanism second side is opposite the mechanism fourth side, the mechanism first side extends along a first axis that is perpendicular to the main axis, the mechanism second side extends along a second axis that is perpendicular to the main axis, wherein the optical element drive mechanism comprises a first corner, a second corner, a third corner, and a fourth corner, a connecting line between the first corner and the second corner is parallel with the first axis, and a connecting line between the first corner and the third corner is parallel with the second axis;
wherein when viewed from the main axis, the mechanism first side and the mechanism third side are located on opposite sides of the movable part;
wherein the circuit assembly further comprises:
a third circuit element having a plate-like structure and perpendicular to the main axis; and
a second connection portion connected to the first circuit element and the third circuit element;
wherein the first circuit element is electrically connected to the third circuit element via the second connection portion;
wherein when viewed from the main axis, the first circuit element and the third circuit element at least partially overlap;
wherein the first circuit element further comprises a third side, the third circuit element comprises a fourth side, and when viewed from the main axis, the third side of the first circuit element and the fourth side of the third circuit element are located on the mechanism third side;
wherein the second connection portion protrudes from the third side of the first circuit element and the fourth side of the third circuit element.

11. The optical element drive mechanism as claimed in claim 10, wherein a thickness of the third circuit element is identical to a thickness of the second circuit element, and a thickness of the first circuit element is identical to the thickness of the second circuit element.

12. The optical element drive mechanism as claimed in claim 10, wherein when viewed from the main axis, the second circuit element and the third circuit element do not overlap;
wherein when viewed from the second axis, the second circuit element and the third circuit element at least partially overlap.

13. The optical element drive mechanism as claimed in claim 10, wherein the first circuit element further comprises a third circuit, the drive assembly further comprises a third coil and a fourth coil, the third coil is disposed in the third circuit element, the fourth coil is disposed in the first circuit element, and the third coil is electrically connected to the fourth coil and the second circuit;
wherein when viewed from the main axis, the third coil and the third circuit do not overlap;
wherein when viewed from the main axis, the third coil and the fourth coil at least partially overlap.

14. The optical element drive mechanism as claimed in claim 13, wherein the first coil and the third coil are electrically independent;
wherein when viewed from the main axis, the first coil and the third coil do not overlap;
wherein when viewed from the main axis, the first coil is located on the first corner and the second corner, and the third coil is located on the third corner and the fourth corner.

15. The optical element drive mechanism as claimed in claim 10, wherein when viewed from the main axis, a first space is formed between the second circuit element and the third circuit element, and the first space is located on the mechanism second side;
   wherein when viewed from the main axis, a second space is formed between the second circuit element and the third circuit element, and the second space is located on the mechanism fourth side;
   wherein when viewed from the main axis, a connecting line between a center of the first space and a center of the second space is neither parallel with nor perpendicular to the first axis;
   wherein when viewed from the first axis, the first space and the second space do not overlap;
   wherein when viewed from the second axis, the first space and the second space do not overlap.

16. The optical element drive mechanism as claimed in claim 10, wherein the immovable part further comprises a bottom, the bottom comprises a first positioning element and a second positioning element, and the first positioning element and the second positioning element correspond to the circuit assembly;
   wherein when viewed from the main axis, the first positioning element is located on the mechanism second side, and the second positioning element is located on the mechanism fourth side;
   wherein when viewed from the main axis, the first positioning element and the second positioning element are arranged along the first axis.

17. The optical element drive mechanism as claimed in claim 16, wherein the circuit assembly further comprises an external connection circuit, the external connection circuit and the bottom are formed integrally as one piece, at least part of the external connection circuit is embedded in the bottom and not revealed from the bottom, and the circuit assembly is electrically connected to an external circuit via the external connection circuit;
   wherein the first surface of the first circuit element faces the external connection circuit.

18. The optical element drive mechanism as claimed in claim 17, wherein the circuit assembly further comprises an electrical contact between the first surface and the external connection circuit;
   wherein the bottom further comprises a bottom recess and a bottom notch, the bottom recess is formed on a surface of the bottom, the bottom recess has a concave structure and corresponds to the sensing element, the bottom notch is formed on the surface of the bottom, and the bottom notch has a concave structure and corresponds to the electrical contact;
   wherein the external connection circuit comprises an external connection circuit opening, a light passes through the external connection circuit opening, the external connection circuit opening communicates with the bottom recess, and the external connection circuit opening and the bottom notch are separate.

19. The optical element drive mechanism as claimed in claim 18, wherein the external connection circuit further comprises a projecting portion protruding from the bottom notch.

* * * * *